(12) United States Patent
Beshai et al.

(10) Patent No.: US 6,888,848 B2
(45) Date of Patent: May 3, 2005

(54) COMPACT SEGMENTATION OF VARIABLE-SIZE PACKET STREAMS

(75) Inventors: Maged E. Beshai, Sstittsville (CA); Ernst A. Munter, Kanata (CA)

(73) Assignee: Nortel Networks Limited (CA)

( * ) Notice: Subject to any disclaimer, the term of this patent is extended or adjusted under 35 U.S.C. 154(b) by 881 days.

(21) Appl. No.: 09/735,471

(22) Filed: Dec. 14, 2000

(65) Prior Publication Data

US 2004/0213291 A1 Oct. 28, 2004

(51) Int. Cl.⁷ .......................... G01R 31/08; H04J 3/24; H04L 12/54; H04L 12/50
(52) U.S. Cl. ....................... 370/474; 370/235; 370/359; 370/412
(58) Field of Search ................................ 370/389, 393, 370/400, 255, 351, 464, 576, 473, 412, 395.1, 235, 474, 359; 373/225

(56) References Cited

U.S. PATENT DOCUMENTS 5,745,486 A * 4/1998 Beshai et al. ............... 370/352
6,442,139 B1 * 8/2002 Hosein ....................... 370/236
6,445,696 B1 * 9/2002 Foodeei et al. ............. 370/356
6,477,164 B1 * 11/2002 Vargo et al. ................ 370/356
6,724,728 B1 * 4/2004 Manchester et al. ..... 370/236.2

* cited by examiner

Primary Examiner—Duc Ho
(74) Attorney, Agent, or Firm—Steubing McGuinness & Manaras LLP

(57) ABSTRACT

A method is described for segmenting a data stream comprising variable-size packets, a data stream being defined by its source node, sink node, assigned network route, and other attributes. The segments are of equal size and the method concatenates the packets in successive segments in a manner that attempts to minimize segmentation waste without undue delay. The method facilitates the construction of efficient networks that scale to very high capacities while respecting service-quality specifications. Apparatus for implementing the method are also described.

24 Claims, 16 Drawing Sheets

COMPACT SEGMENTATION OF VARIABLE-SIZE PACKET STREAMS

BACKGROUND TO THE INVENTION

1. Technical Field

This invention relates generally to the field of data networks. In particular, it relates to a method and apparatus for segmenting concatenated variable-size packets of a data stream in order to simplify network design and increase transport efficiency while observing delay constraints to ensure high-performance.

2. Description of the Related Prior Art

A data network comprises a number of source nodes, each source node receiving traffic from numerous traffic sources, and a number of sink nodes, each sink node delivering data to numerous traffic sinks. The source nodes can be connected to the sink nodes directly or through core nodes.

The design of a data network is significantly simplified if data is transferred in fixed-size packets. However, typical data sources generate packets of variable sizes. A common approach, used in ATM for example, is to segment each packet individually into 'cells' of a predetermined size. A last cell of each packet would then be filled with null data. It is possible then that a large proportion of the cells become poorly utilized, depending on the packet-size distribution and the selected cell size. This can lead to relatively high capacity waste. For example, if the cell size is 1000 bits and the packet size for a high proportion of packets is within the range 1000 to 1200 bits, the relative capacity waste can be of the order of 40%. With the varying nature of data composition, it is difficult to characterize the data and to standardize a cell size that optimizes capacity utilization. Capacity waste is not only costly, but it also limits network scalability.

U.S. Pat. No. 5,930,265, issued to Duault et al on Jul. 27, 1999, describes a data processing method for efficiently transporting multimedia packets over a network that serves packets of fixed length. The method includes a step of concatenating the multimedia packets, generated by a number of users, and appending the concatenated data packets with a sub-header that identifies the individual packets. The method is primarily concerned with low-speed data and the aggregation delay is not taken into consideration.

Methods of packet concatenation that aim at minimizing capacity waste under delay constraints are required in order to realize efficient high-performance networks.

SUMMARY OF THE INVENTION

It is therefore an object of the invention to develop a method of transferring variable-size packets in fixed-size data segments without incurring a significant capacity waste or unacceptable segment-formation delay.

It is a further object of the invention to develop an apparatus for concatenating variable-size packets that belong to a common data stream.

It is another object of the invention to develop an apparatus for compact packet segmentation that can operate at incoming-channel speed.

It is a further object of the invention to develop a circuit for fast concatenating of two packets of arbitrary lengths to produce complete segments of a predefined length.

It is yet another object of the invention to develop a data segment format that promotes resource sharing by a multiplicity of users.

The invention therefore provides a method of transfer of variable-size packets, each packet being associated with a defined data stream, wherein the packets of a defined data stream are concatenated and transferred in equal-size segments. A rate controller that operates under instructions from a quality controller governs the rate of transfer of data from a source node to a sink node.

In accordance with one aspect of the present invention, there is provided, at a source node of a data network, a method of packet packing into fixed-size data segments. The packets received from incoming channels are first segmented into plain segments of a fixed size then the plain segments are merged into compact segments having less null-padding. The packing process is performed under delay constraints in order to ensure that an already received packet does not experience undue delay while awaiting merger with forthcoming packets. The method further adapts the delay limit to allocated transfer rates from a source node to a sink node.

In accordance with a further aspect of this invention, there is provided a structure of a heterogeneous data segment that enables the assembly and parsing of distinct packets. The structure includes a front header and a number of inner headers.

In accordance with another aspect of the present invention, there is provided a data structure that facilitates the formation of composite data segments, each composite data segment potentially containing data from more than one user. The data structure enables fast concatenation.

In accordance with a further aspect of the present invention there is provided an apparatus for concatenating variable-size packet under transfer-rate control and delay thresholds, the delay thresholds being determined by allocated transfer-rate control. The apparatus can concatenate packets from a multiplicity of streams. The apparatus comprises:

(1) A directly-indexed auxiliary data memory ("A") having one entry per stream and storing segment fractions;
(2) A principal data memory ("B") storing an arbitrary number of full segments per stream, the segments of each stream being linked using an interleaved link-list structure;
(3) A control memory C;
(4) A, enqueueing controller that controls the formation of full data segments and the transfer of full segments from the auxiliary data memory to the principal data memory. The enqueueing controller uses a shift connector that enables parallel merging of incomplete segments. It also tracks the packet remainder of each stream using the content of control memory ("C");
(5) A dequeueing control circuit that controls the transfer of segments downstream, and
(6) A shift connector that enables parallel merging of incomplete segments.

In accordance with a further aspect of the present invention, there is provided an algorithm for concatenating variable-size packets at incoming-channel speed where the concatenation process is performed at a rate that exceeds the rate of receiving fresh packets from the incoming channels.

In accordance with a further aspect of the present invention, there is provided a circuit for joining two fractional segments of arbitrary occupancy to produce either a single fractional or complete segment or a complete segment and a remainder. The circuit uses a shift connector for parallel word transfer. The shift connector can be constructed to arbitrarily high capacities by cascading arrays of smaller-size shift connectors.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

It will be noted that throughout the appended drawings, like features are identified by like reference numerals.

DETAILED DESCRIPTION OF THE PREFERRED EMBODIMENT

Figure 1:
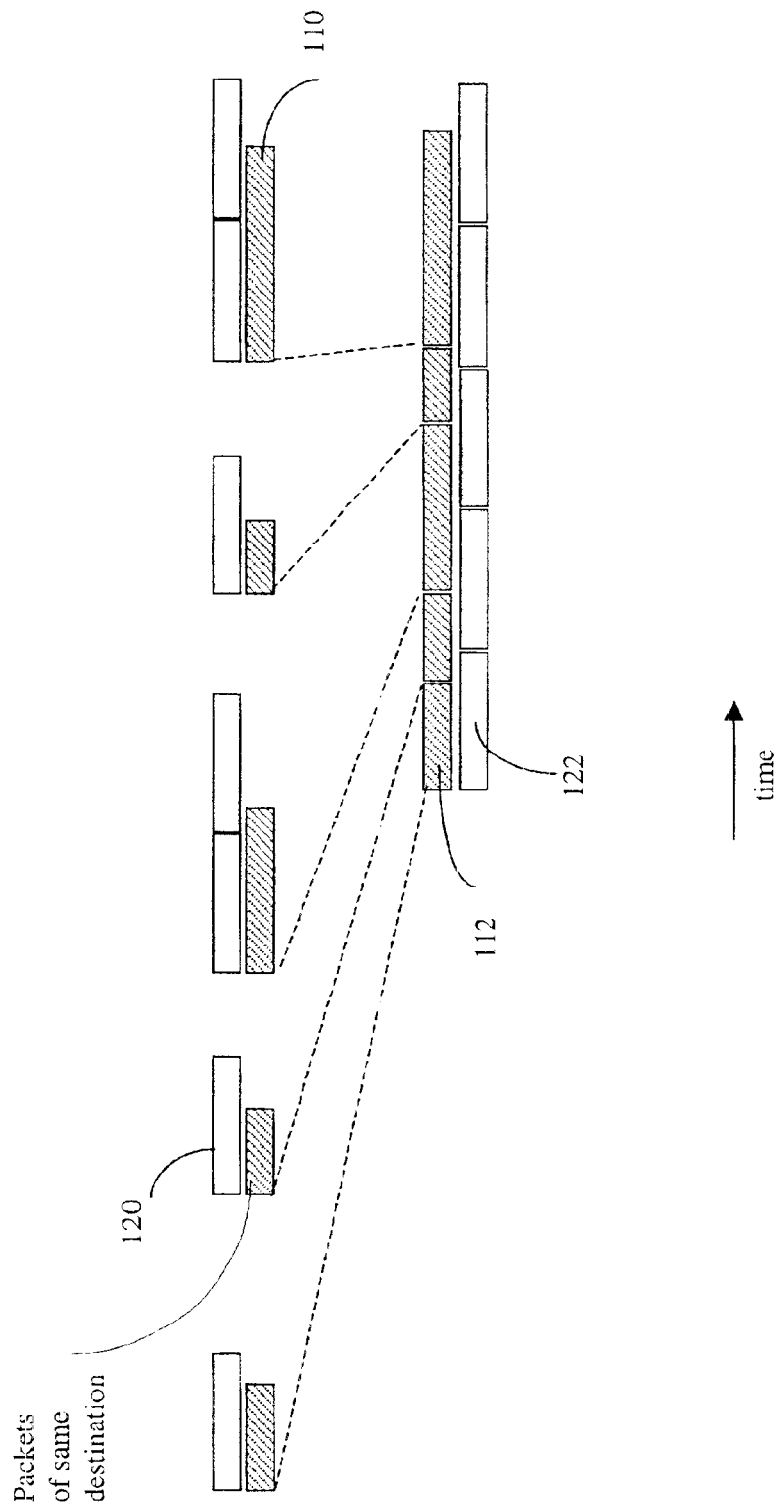
FIG. 1 compares a conventional segmentation process of individual packets with a process of segmentation of delayed and concatenated packets.

This invention relates to a communication network transferring variable-size data packets. Packets that belong to the same data stream may be concatenated and segmented into fixed-size data blocks, a data stream being defined according to predefined attributes, such as its origin and destination. When multiple paths are provided from a point of origin to a given destination, the traffic in each path is treated as a distinct traffic stream. Packets can first be segmented, in a conventional manner, into fixed-size data blocks, hereafter also called data segments or simply segments, which may contain filler null data. A fully utilized segment is hereinafter called a "complete segment" and a null-padded incomplete segment is called a "fractional segment". FIG. 1 is a schematic diagram illustrating the segmentation of variable-size packets. The size of a segment is standardized across a respective network. A packet 110 is divided into an integer number of segments, the last of which may not be fully utilized and, hence, null-padded. The number of segments per packet varies from 1 to a maximum determined by an upper bound of a packet length. Packets 110 are restructured in segment format 120. The capacity waste due to null padding is apparent from FIG. 1 where, over a large time window, the cumulative length of segments 120 may significantly exceed the cumulative length of packets 110. Segments may be joined before transfer to enable removing some or all of the null data. If, by some artifice or another, the packets 110 are delayed to form packet clusters 112, the segmentation 122 results in a lower waste. The cumulative length of segments 122 is slightly higher than the cumulative length of packets 110, the cumulative length being considered over an appropriate time window. Applying an artificial delay is straightforward. However, the amount of applied delay has to be properly gauged to avoid unnecessary service degradation.

The timing of the transfer of segments that contain portions of two or more packets must be selected so as to increase the opportunity of joining successive packets, belonging to a given stream, without resulting in excessive delays. The concatenation delay increases with the variance of packet inter-arrival time. A brute-force timing method would delay an incomplete segment until a new packet of the same stream arrives, or until a predetermined delay tolerance expires, whichever takes place first. A more efficient method, which reduces segmentation delay while attempting to maximize capacity utilization, is to use rate control in conjunction with a segmentation device. Any of prior-art rate-control mechanisms may be used.

To illustrate the need for a rate-adaptive delay threshold, consider, for example, data streams of two types, labeled "A" and "B". A type "A" data stream has a mean bit rate of 100 kb/s (kilobits/second) and a type "B" data stream has a mean bit rate of 1 Gb/s (gigabits/second). The segment size for each type is 1 kilobit. Thus, the mean inter-segment time is 10 milliseconds for a type "A" data stream and 1 microsecond for a type "B" data stream. A typical source node would support numerous type "A" data streams and a smaller number of type "B" data streams. If a delay threshold of less than 10 milliseconds is used, the concatenation gain, i.e., the reduction in null padding, would be insignificant for the type "A" data streams. If a delay threshold of 20 milliseconds is used, which is larger than the inter-segment interval for the type "A" data streams, a reasonable concatenation gain is realized for the type "A" (and of course for the type "B") data streams. A delay of this magnitude is, however, unacceptable for the higher speed type "B" data streams. A delay that is proportional to the segment inter-arrival time is an appropriate choice. A normalized delay threshold may be defined as an integer multiple, Q, of the inter-segment interval. A value of Q between 1 and 7, inclusive is preferred. It is noted that a value of Q equal to zero is permitted. It indicates that a segment is eligible for transfer once it is received, regardless of the extent of its null padding, if any. Thus, in general, the preferred range of Q is $0 \leq Q \leq 7$.

Preferably, the network core should transfer segments in the order in which they were formed. However, if the network core can not guarantee contiguous segment succession, the segments of each stream may be consecutively labeled at respective source nodes so that the segments can be placed in proper order at the sink node. Even in a network that delivers segments in proper order, segment labeling is desirable in order to identify lost segments, if any. As mentioned earlier, a data stream is identified by, at least, a source node and a sink node. The number of bits needed to label a segment is determined by an upper bound of displacement of successive segments of the same data stream. If it can be determined that the highest displacement is, for example, less than 16 segments (a maximum of 16 interleaving out-of-order segments), then a five-bit label would suffice (to handle a disorder of +/−16 segments). In addition, conventional segment demarcation is applied.

If two segments of the same data stream are separated by T1 time slots, a time slot being a segment duration, at their source node and by T2 time slots at their sink node, then the disorder "D" is the absolute value of the difference between T2 and T1, i.e., D=|T2−T1| where |x| denotes the absolute value of a number x. The extreme disorder in a data stream is the maximum value of D experienced by any two segments in said data stream.

When multiple routes are available to carry data from a source node to a sink node, the data flow from the source node to the sink node through each route constitute a data stream.

A source node supports a multiplicity of sources and a sink node supports a multiplicity of sinks. The segments of a data stream, may belong to several source-sink pairs. Once it is ascertained that the received segments are in proper order, the sink node parses the segments according to the information in the embedded packet headers and reconstructs the packets in a manner well known in the art, then delivers the constructed packets to respective sinks. It is emphasized, however, that network architectures that guarantee segment transfer in proper order, and therefore eliminate the need for segment reordering at respective sink nodes, are known in the prior art.

Figure 2:
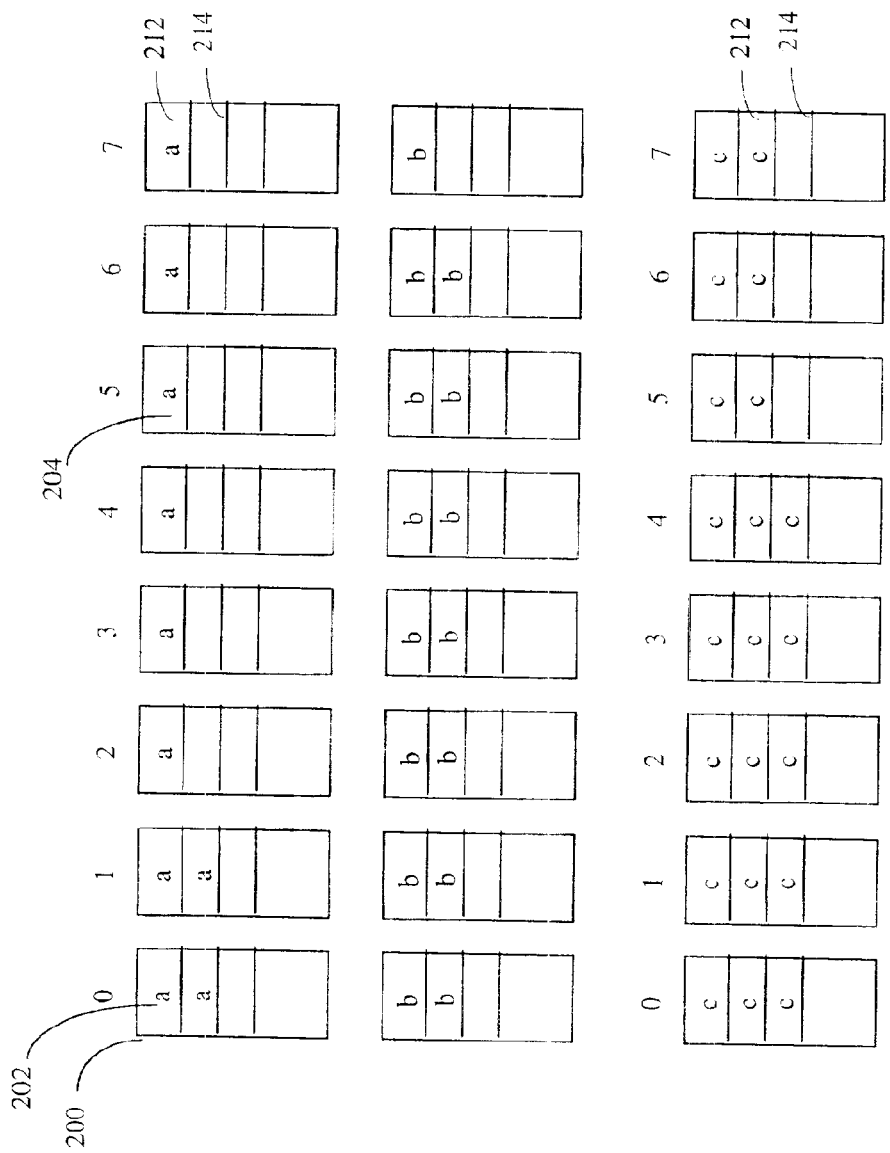
FIG. 2 illustrates the storage of individual packets in parallel memories.

FIG. 2 is a schematic diagram illustrating the storage of a data packet in an array of memories, each memory storing a word of a predefined size. A word may contain two octets, for example. In the example of FIG. 2, there are eight parallel memory devices. A packet, "a", having ten words, occupies two rows of 8 words each. Similarly, each of packets "b" and "c" occupies an integer number of 8-word rows. Data in a row 212 or 214 form a data segment that may be read in one memory-access time. The data in a row 212 occupy a complete segment while the data in a row 214 occupy a fractional segment.

Figure 3:
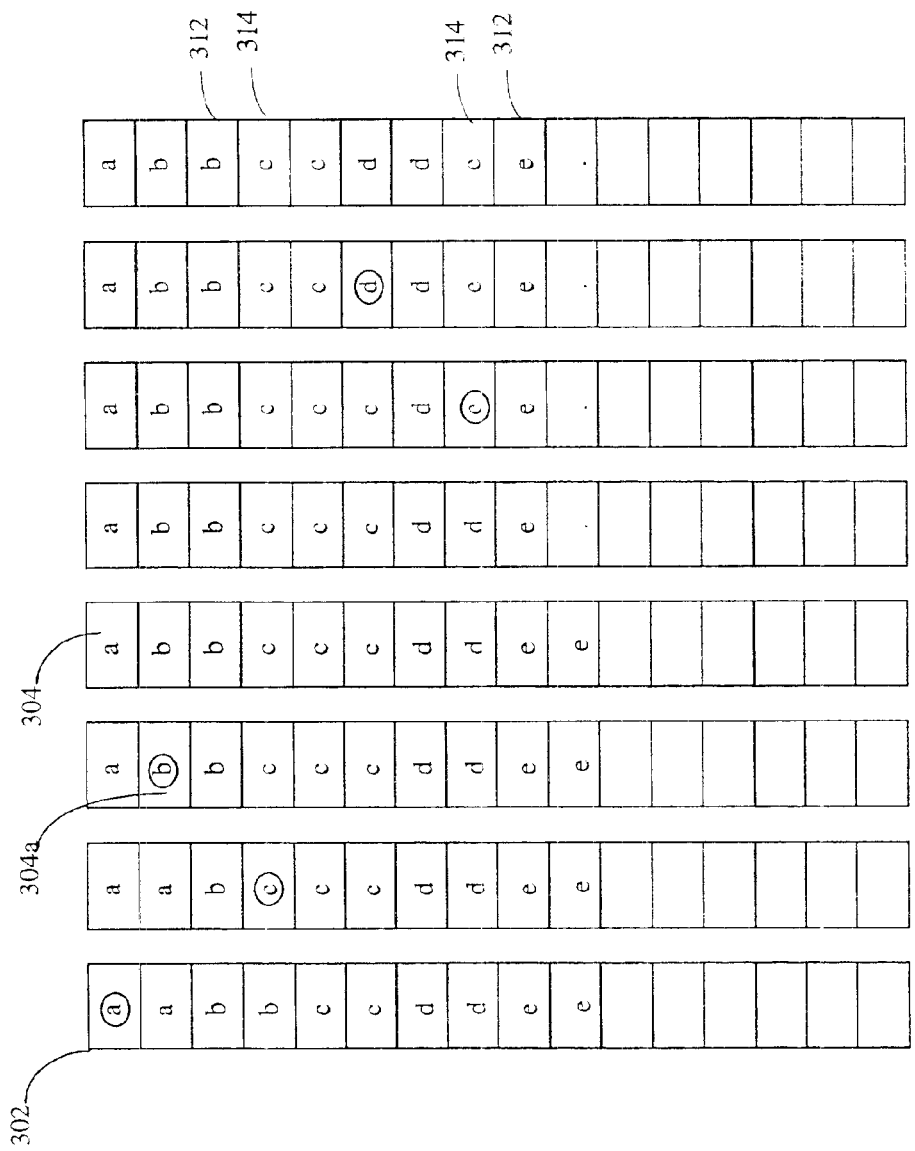
FIG. 3 illustrates a preferred method of parallel storage of packets of a same stream in parallel memories in accordance with the invention.

FIG. 3 schematically illustrates the desired storage arrangement of packets "a", "b", "c", etc., in the same memory array. Each column 302 in FIG. 3 corresponds to data words 304 stored in a memory device. A data word 304a is a first word in a new packet. A row may contain words belonging to different packets. A controlled delay may be applied to form a mixed-packet row as will be described in detail. The data in any row in FIG. 3 is transmitted in a data segment. The data in a row 312 or 314 occupy a complete segment. A segment formed by a row 312 contains data from a single packet while a segment formed by a row 314 contains data from two (or more) packets.

The network comprises source nodes and sink nodes interconnected by core nodes. Packets of variable size are received at ingress ports of a source node. Each packet contains identifiers of its destination and an indication of its size, amongst other parameters. The packets are segmented into fixed-size plain segments of a predetermined fixed size. A plain segment contains data belonging to a single packet. The last segment of each packet may be incomplete and null padded. The plain segments are preferably packed into compact segments having a reduced padding waste. Thus, a compact segment may contain data belonging to different packets. Segment packing may take place either at the ingress ports of source nodes or at the output ports of source nodes, as will be explained with reference to FIGS. 4, 5, and 6.

Figure 4:
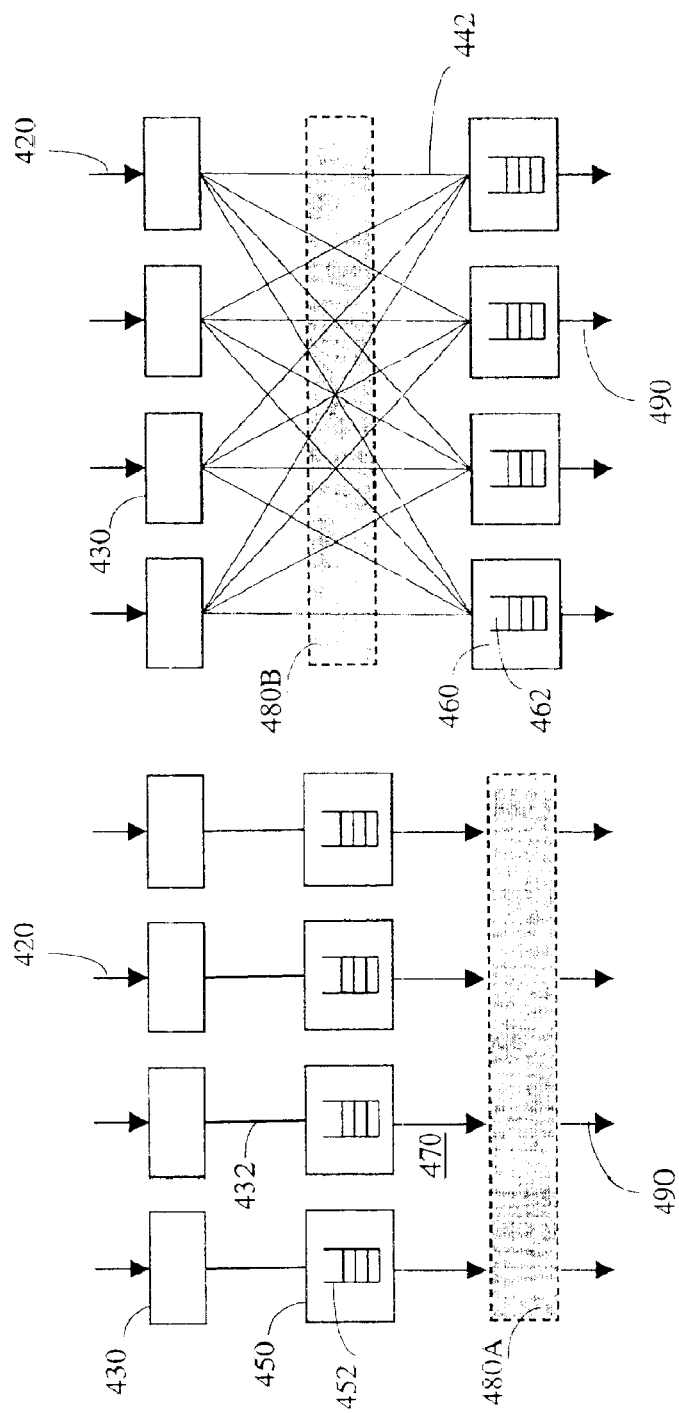
FIG. 4 is a schematic diagram illustrating a two-phase segmentation process.

FIG. 4 illustrates a two-phase segmentation process in a general data network. Data received from incoming channels 420 are parsed into separate individual packets having arbitrary lengths. In a first phase, primary packet segmentation is performed where each packet is segmented into fixed-size packets in a first segmentation circuit 430. A segment thus formed may have null padding because a packet size may not be an integer multiple of a segment size. In a second phase, secondary packet segmentation is performed where the segments formed in the first phase are merged in order to reduce the extent of the null padding.

In one embodiment, the second phase segmentation is applied to the data received from segmentation circuit 430 independently. The segments formed in the first-phase and belonging to a specific incoming channel 420 are directed to a second segmentation circuit 450 where they are sorted according to a stream identifier, a stream identifier may be a sink node identifier or a sink node identifier plus a service-class identifier. The sorted segments are stored in buffers 452, each of which may contain segments destined to a specific sink node in the network. The sorted segments are intentionally delayed to join forthcoming segments of the same stream. The merged segments are then switched in a switching matrix 480A to outgoing links 490 towards respective sink nodes.

In another embodiment, the second-phase segmentation is applied to data received from a plurality of incoming channels 420. The data received from incoming channels 420 are first segmented in circuits 430 then the resulting segments are switched in a switching matrix 480B to second-phase segmentation circuits 460. Each segmentation circuit 460 handles segments belonging to a subset of the sink nodes. The segments received at a segmentation circuit 460 are carried by an outgoing link 490 towards the designated subset of sink nodes. In order to increase the second-phase segmentation gain, i.e., to minimize the null padding, the routing of data from incoming channels 420 to outgoing channels 490 should aim at selecting the paths from the plurality of incoming channels 420 to each sink node through a small number of outgoing channels 490.

The segments formed by circuit 450 are hereinafter called "combined segments". A combined segment contains data received from the same incoming channel 420 and may belong to different traffic sources. The segments formed by circuit 460 are hereinafter called "composite segments". A composite segment contains data that may be received from several incoming channels 420 and different traffic sources. The demarcation and parsing of composite segments will be described in more detail. Since a combined segment is a special case of a composite segment, both will be referenced as a composite segment, except when distinction is necessary.

The sizes of the segments formed in the first phase and the second phase may differ. However, second-phase segments cannot be smaller than the first phase segments. It is advantageous to select the first phase segment size to be relatively small, since the first-phase segmentation applies to individual packets and the smaller the segment, the lower the null-padding waste. Smaller first-phase segments increase the complexity of the segmentation circuit. However, this complexity is contained within the source node and the selection of the size of the second-phase segments is more critical since the latter traverse the network towards the sink node. It is preferable to select the size of the second-phase segment to be an integer multiple of the first phase segment. The second-phase segments are transported across the network and, hence, should be packed as efficiently as possible. Selecting the size of the second-phase segments to be relatively small (one kilobit for example) increases the packing efficiency at the expense of control complexity at the switching core nodes. The second-phase segment size should therefore be selected to be large enough to reduce switching-control complexity, and small enough to reduce null-padding waste. Likewise, the concatenation delay threshold should be large enough to increase the opportunity of joining packets of the same stream and small enough to meet quality-control objectives. The selection of both the second-phase segment size and the delay threshold are based on engineering judgement. A preferable second-phase segment size is 4 kilobits and the delay threshold may vary from a few microseconds to a few milliseconds, depending on the traffic stream.

It is noted that providing quality control does not necessarily mean providing a high service quality to every traffic stream. Rather the quality control function ensures that the network response is commensurate with the service expectation of each stream.

The quality-control function is governed by a quality controller, which operates to implement service-quality objectives. The quality controller may enforce providing a gauged service rate to a data stream. The gauged service rate can be set by the individual traffic sources of a data stream. The gauged service rate can also be set by a source node on behalf of its traffic sources. A source node determines an appropriate service rate for an entire data stream, which may include data from a plurality of sources, by monitoring its traffic to a plurality of sink nodes.

Figure 5:
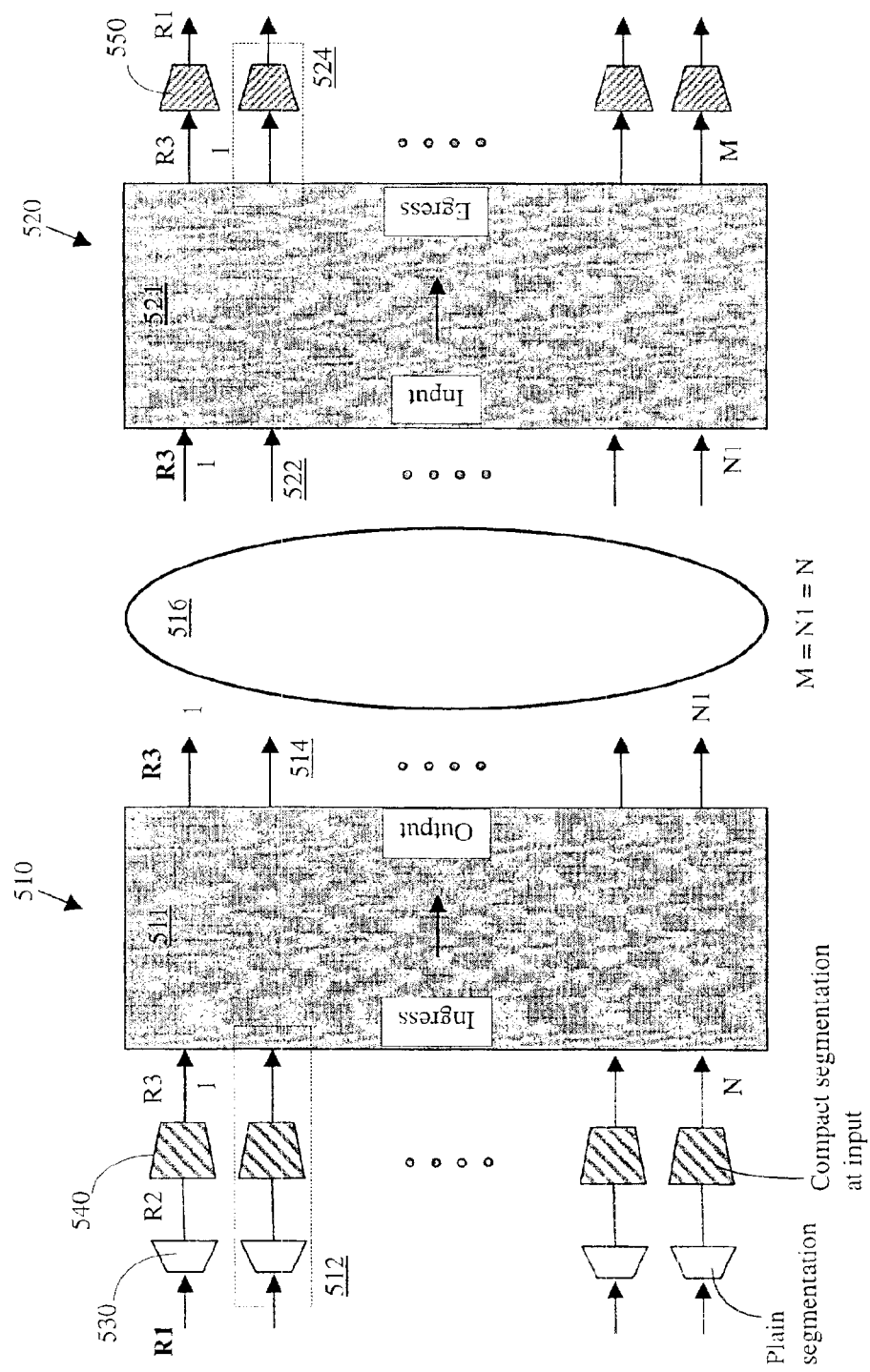
FIG. 5 is a schematic diagram illustrating a source node applying ingress-port packet concatenation.
Figure 6:
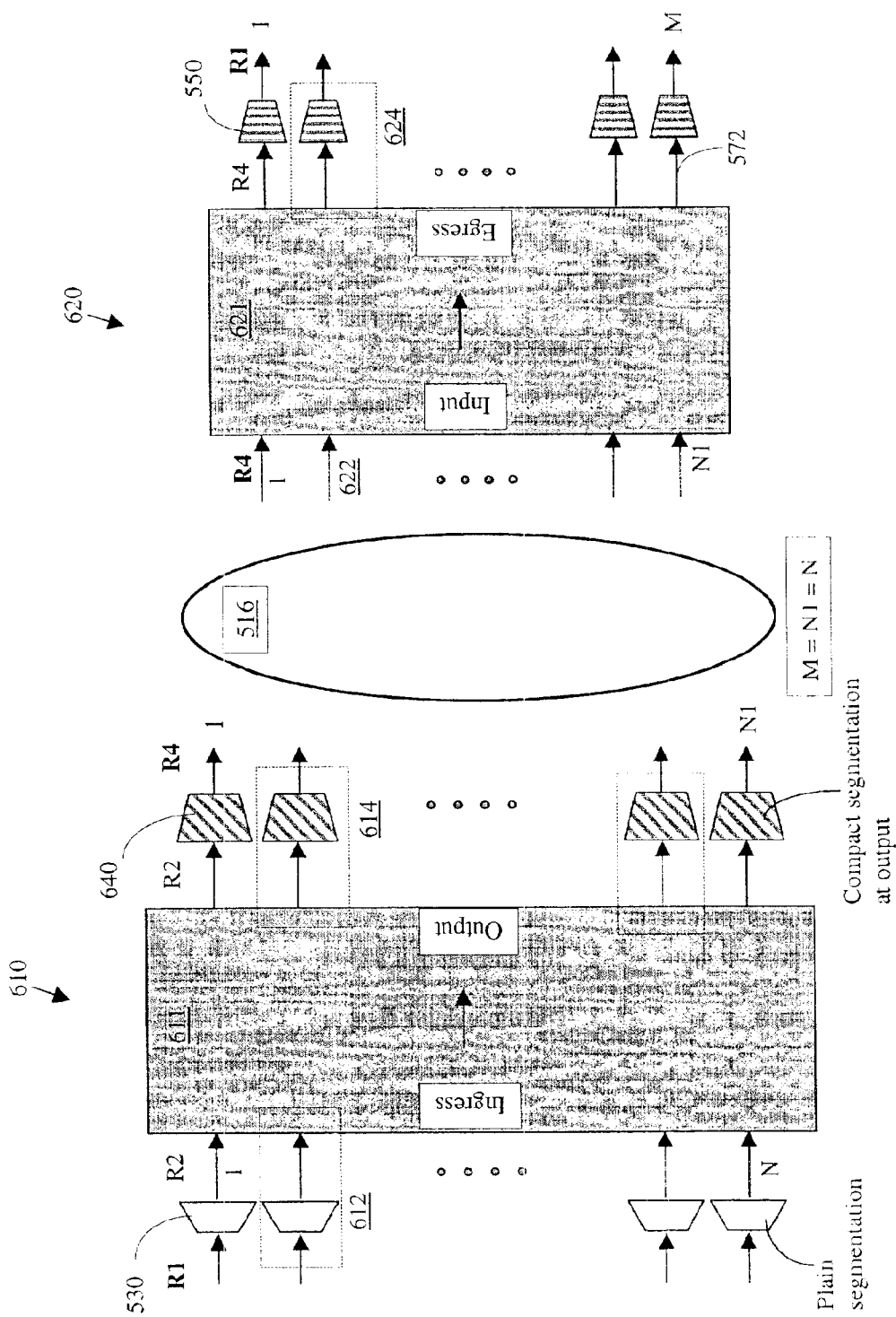
FIG. 6 is a schematic diagram illustrating a source node applying ingress-port primary segmentation and output-port secondary segmentation.

Referring to FIGS. 5 and 6, each of which illustrate a source node and a sink node, data is received from the traffic sources, directly or indirectly, at the ingress ports 512/612 on the ingress side of the source node. The data is transferred to the network through the output side of the source node, the output side comprising output ports 514/614. Data is received at the sink node at the input side of the sink node, the input side comprising input ports 522/622. Data is transferred from the sink node to the traffic sinks, directly or indirectly, through the egress side of the sink node, the egress side comprising egress ports 524/624. It is customary to combine a source node and a sink node into a single edge node having a common controller for the source and sink components, and possibly having a common payload data storage for the two components.

FIG. 5 illustrates the process of concatenating packets at the ingress side of a source node. The figure shows a schematic of a source node 510 having N>1 ingress ports 512 and a sink node 520 having M>1 egress ports 524. The source node 510 has N1 output ports 514 and the sink node 520 has N1 input ports 522. Typically, N, N1, and M are equal. Individual packets are received from optical channels in serial bit streams at the ingress ports 512 of the source nodes. The packets must be converted into parallel format for further processing by electronic circuitry. The initial step is to store each packet in parallel memory devices. At each ingress port 512, a prior-art segmentation circuit 530 segments incoming variable-size packets into plain segments, each containing payload data belonging to a single packet and may contain null padding if the payload data is not sufficient to fill a segment. Segmentation circuit 530 must operate at channel speed, i.e., a packet processing time should not exceed a packet receiving time.

A second compact segmentation circuit 540 attempts to concatenate segments of a given stream, for example segments directed to the same sink node, in order to reduce the extent of null padding. The segments formed by concatenation include both plain segments and combined segments. The resulting packed segments are then switched through segment switch 511 to respective output ports 514, and thence, towards respective sink nodes 520. At a sink node 520, the segments are switched from input ports 522 to egress ports 524 through segment switch 521. At each egress port 524, a packet reconstruction circuit 550 parses the segments and reconstructs the original packets, which are then transferred to respective sinks (not shown). The segment switches 511 and 521 can be separate entities, or can be combined into a "folded" structure in a manner well known in the art. The segment switch can be implemented as a classical space switch or a rotator-based space switch as described in U.S. Pat. No. 5,745,486 issued to Beshai et al. on Apr. 28, 1998. The main advantages of the rotator-based switch are its high scalability and simplicity of contention control.

FIG. 6 illustrates the process of merging segments at the output side of a source node. The figure shows a schematic of a source node 610 having N>1 ingress ports 612 and a sink node 620 having M>1 egress ports 624. The source node 610 has N1 output ports 614 and the sink node 620 has N1 input ports 622. Each of the N input ports has a prior-art segmentation circuit 530 that breaks the packets into plain segments as described above in connection with FIG. 5. The plain segments at any ingress port 612 are then switched through segment switch 611 to any of the N1 output ports 614. At the output ports 614, the plain segments are packed by compact-segmentation circuit 640 before being transferred to respective sink nodes 620 through network core 516. At the sink node 620, the segments are switched from input ports 622 to egress ports 624. At each egress port 624, a packet reconstruction circuit 550, identical to the one used in the sink node of FIG. 5, parses the segments and reconstructs the original packets, which are then transferred to respective sinks (not shown). The compact segmentation circuits 540 and 640 differ in their points of application, the former operating at the ingress side, the latter at the output side, of a source node. Otherwise their components are identical.

In FIG. 5 and FIG. 6, the incoming links carry data at a rate R1 per port as indicated. With plain segmentation, the data rate R2 at the output of a circuit 530 is higher than the rate R1 due to the null padding. The compression in circuit 540 to reduce the null padding reduces the data rate from R2 to R3. The segment-switch 511 is an N×N switch with a capacity of N×R3 (in this example, N1=N). The data rate at each output port of segment switch 611 is R2. The compression in circuit 640 reduces the rate R2 to R4. The two compression circuits 540 and 640 are identical. However, the compression in circuit 640 is more effective than the compression in circuit 540 because the former aggregates a consolidated stream of plain segments received from several ingress ports of a source node. The segment-switch 611 is an N×N switch with a capacity of N×R2. Thus, concatenation at output increases the transport efficiency but requires a higher-capacity switch at the source node. The source node 610 and sink node 620 can be combined in a single edge node sharing a common controller and, possibly, a common payload memory.

Switch 611 of a source node 610 and switch 621 of sink node 620, belonging to the same edge node, may handle segments of different sizes. The segment size, G1, at an input port of switch 611 is preferably smaller than the segment size, G2, at the output of aggregation circuit 640. The aggregation function in circuit 640 is easier to implement if G2 is an integer multiple of G1. The segment size at each ingress port of switch 611 is G1 and at each input port of switch 621 is G2.

In one embodiment, the two switches 611 and 621 operate independently and each can be adapted to switch segments of any specified size.

In another embodiment, the two switches 611 and 621 are combined into a single fabric and they share data memory and control. In an edge node comprising a source node and a sink node, the switching fabrics of the source node and the sink node are often combined in a single fabric. When G2 equals G1, combining a switch 611 and a switch 612 in a single fabric is straightforward. If G2 is not equal to G1, combining the two switches in a single fabric may require complex controls. However, the control of the combined single fabric is greatly simplified if the two segment sizes G1 and G2 bear a rational relationship to each other. A rotator-based switch, having a plurality of input ports and a plurality of output ports, as described in U.S. Pat. No. 5,745,486 issued to Besbai et al. on Apr. 28, 1998, enables each input port to deliver an integer number of data segments destined to one or more output ports during an input access interval and each output port to receive an integer number of data segments during an output access interval. The input access interval and the output access interval need not be equal. Furthermore, one of the inherent properties of said rotator-based switch is that the sizes of data segments at any input port need not be equal. However, to avoid capacity waste, the segment sizes are preferably predefined to favorable values. In the simplest form, with only two segment sizes G1 and G2, if G2 is an integer multiple of G1, and employing classical packing techniques, data streams adopting either segment sizes, or both, can efficiently share a common rotator-based fabric.

If the capacity per channel in network 516 is 10 Gb/s, then R3 should not exceed 10 Gb/s. The expansion in circuit 530 is expected to be high because each packet is segmented individually. The compression in circuit 540 does not completely offset the expansion in circuit 530. Typical values of the expansion in circuit 530 and the compression in circuit 540 are 1.5 and 1/1.2. This results in limiting R1 to 8 Gb/s, with N×N switching fabric 511 operating at ingress/output port speeds of 10 Gb/s. The compression ratio in circuit 640 is expected to be higher than that of circuit 540. The two circuits 540 and 640 are identical. However, circuit 640 merges packets received from several ingress ports and hence has a better gain, i.e., a better opportunity of joining other packets, than circuit 540, which merges packets from a single ingress port. It is noted, however, that the segments received at a circuit 640 may occasionally belong to a single data stream. With a value of R4 in FIG. 6 equal to 10 Gb/s and with a compression ratio in circuit 640 equal to 1/1.4, the expansion ratio in circuit 530 being 1.5 as in the case of FIG. 5, R1 is limited to 9.3 Gb/s and N×N switching matrix 611 operates at an ingress/output port speed of 14 Gb/s. Thus the overall throughput of the configuration of FIG. 6 is higher than that of the configuration of FIG. 5. The throughput gain is about 16%. This is realized at the expense of a higher-speed switching matrix 611. The use of a first phase segment of a relatively-small size reduces the null-padding data but increases the segment scheduling effort in switch 611. Thus, increasing the scheduling capability permits the use of smaller first phase segments which, in turn, results in reducing the required expansion (dilation) in switch 611.

Referring to FIG. 6, a routing controller (not illustrated) of a source node selects one or more routes to a sink node through one or more output ports. The use of more than one route may be necessitated by traffic volume. Whenever there are many parallel routes of more-or-less equal merit (having the same number of hops or comparable propagation delay), it is preferable that routes be selected in a way that promotes a high segment-aggregation probability at the output port segmentation circuit 640. Generally, the smaller the number of routes used to transfer a data stream, the higher is the opportunity to join segments of the stream.

The network accommodates a heterogeneous mixture of connection-based and connectionless traffic. Service quality can be controlled by establishing connections, either on a per-user basis or per traffic stream, where a traffic stream may contain data from several users. Connections are traditionally established according to user-specified capacity requirement or on the basis of user-provided traffic descriptors. In order to provide a controlled service quality for connectionless traffic streams with unspecified traffic descriptors or capacity requirements, provisional connections can be introduced, as described in detail in U.S. patent application Ser. No. 09/132,465 filed Aug. 11, 1998. In general, a source node can be adapted to determine a service rate requirement for a data stream, or each of a plurality of data streams based on traffic monitoring or performance monitoring with or without consulting the traffic sources.

Each of segmentation circuits 530 and 540 are shown in FIG. 5 to connect to a single input channel and a single output channel. It is possible, however, that a subtending source of a source node deliver its data in multiple channels, and either of circuits 530 and 540 can be adapted, in a straightforward manner, to operate with multiple input channels and multiple output channels.

Figure 7:
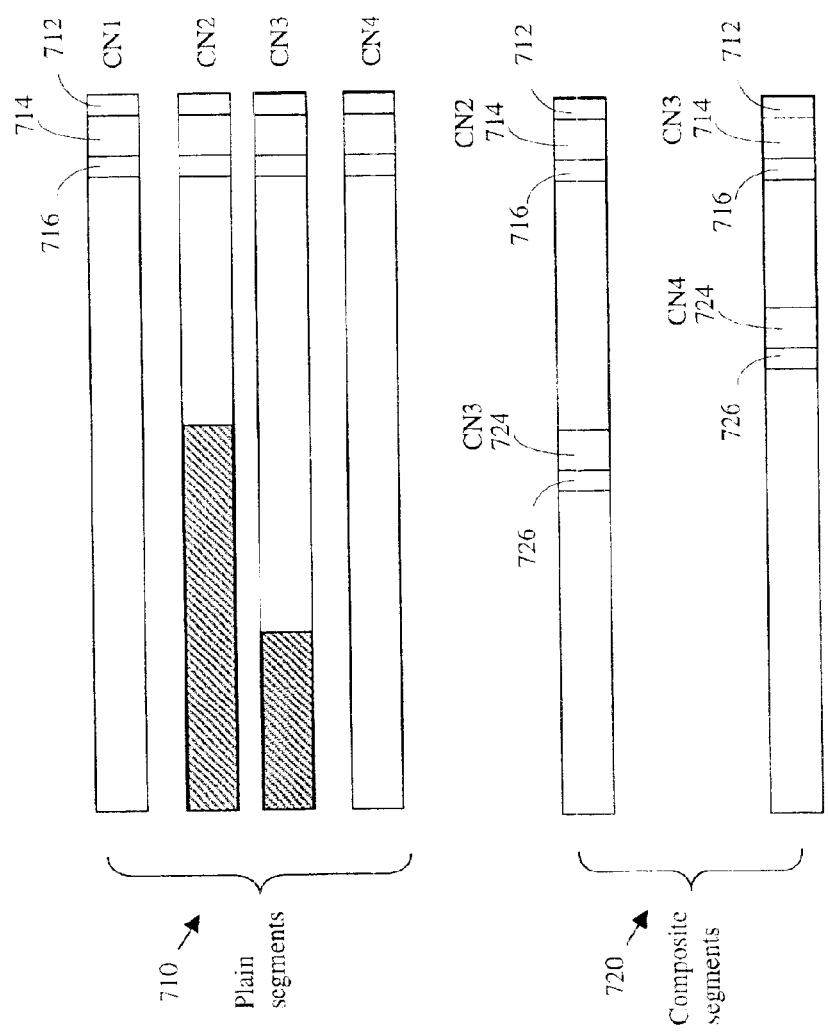
FIG. 7 illustrates the data segment identification fields in plain segments and composite segments.

To enable the reconstruction of packets at the sink node, the segments must be labeled. Labeling is also needed for network routing if multiple hops are required to reach the sink node through network 516. FIG. 7 shows the necessary control fields in any segment, whether plain, combined, or composite. A first field 712, typically one-octet wide, is a cyclic segment identifier (0 to 255), based on an estimated extreme disorder of +/−128 segment slots. As described earlier, if two segments of the same data stream are separated by T1 time slots, a time slot being a segment duration, at their source node and by T2 time slots at their sink node, then the disorder "D" is determined as D=|T2−T1| and the extreme disorder in a data stream is the maximum value of D experienced by any two segments in said data stream.

The field 712 is included to accommodate network cores that may not deliver segments in the order in which they are received. A second field 714, typically two-octets wide, indicates a connection number (CN), and a third field 716 indicates the number of immediately following data octets that belong to the connection identified by field 714.

Segments 710 in FIG. 7 are plain segments each having three fields 712, 714, and 716, as described above. The data in a segment belongs to a single packet. Segments 720 are composite segments resulting from merging plain segments belonging to connection numbers CN2, CN3, and CN4. A composite segment may contain data belonging to several connections. The connection number 714 at a front header can be used for routing within the data network core and for directing data from the sink node to a respective sink. Each additional connection is identified by inserting corresponding connection-number field 724 and data length field 726 to enable parsing the composite segments at the receiving sink node. The fields 724 and 726 within a packet form an "inner header". Field 724 may be shorter than field 714 because field 724 is needed at the sink node only to forward segments to identified sinks while field 714 may be needed for routing within the network as well as directing the data from the sink node to the sink. Thus, field 714 includes sink-node identifier and a sink identifier while field 724 need only include a sink identifier. It is noted that the sizes of fields 712, 714, 716, 724, and 726 are exemplary. A person skilled in the art will have no difficulty in modifying said field sizes to suit the parameters of a specific network. It is also noted that other data attributes that may be needed at a sink node, such as the identifiers of the sinks supported by a sink node, service quality classifications, or multi-cast identifiers, etc., need not be carried in the segment headers and can be determined from the headers of the reconstructed packets. Thus, field 712 may contain only a sink-node identifier, and field 714 may be eliminated if the sink identifier is to be retrieved from the header of a reconstructed packet at the sink node.

In order to simplify the process of parsing composite segments, a predefined upper bound of the number of inner headers is preferably enforced. This, in effect, limits the number of packet memberships per segment, which would be kept below a predefined upper bound because of circuit-design considerations.

Adaptive Delay Threshold

As described earlier, applying an artificial delay to fractional segments offers an opportunity to form complete segments, and hence reduce capacity waste. However, the applied delay must be tailored to the traffic stream. In a rate-controlled network, each traffic stream is adaptively allocated a transfer rate, which is controlled by a scheduler. The delay threshold, in this case, is preferably determined as a function of the allocated transfer rate. The delay threshold may also be determined according to other criteria such as a specified service type associated with selected streams.

The transfer rate allocation to a traffic stream may be explicitly specified by a traffic source or a cluster of traffic sources, or may be determined dynamically by respective source nodes in response to monitored performance or measured traffic levels. The allocated rate, and—hence—the concatenation delay threshold, for a given stream may change with time.

Figure 8:
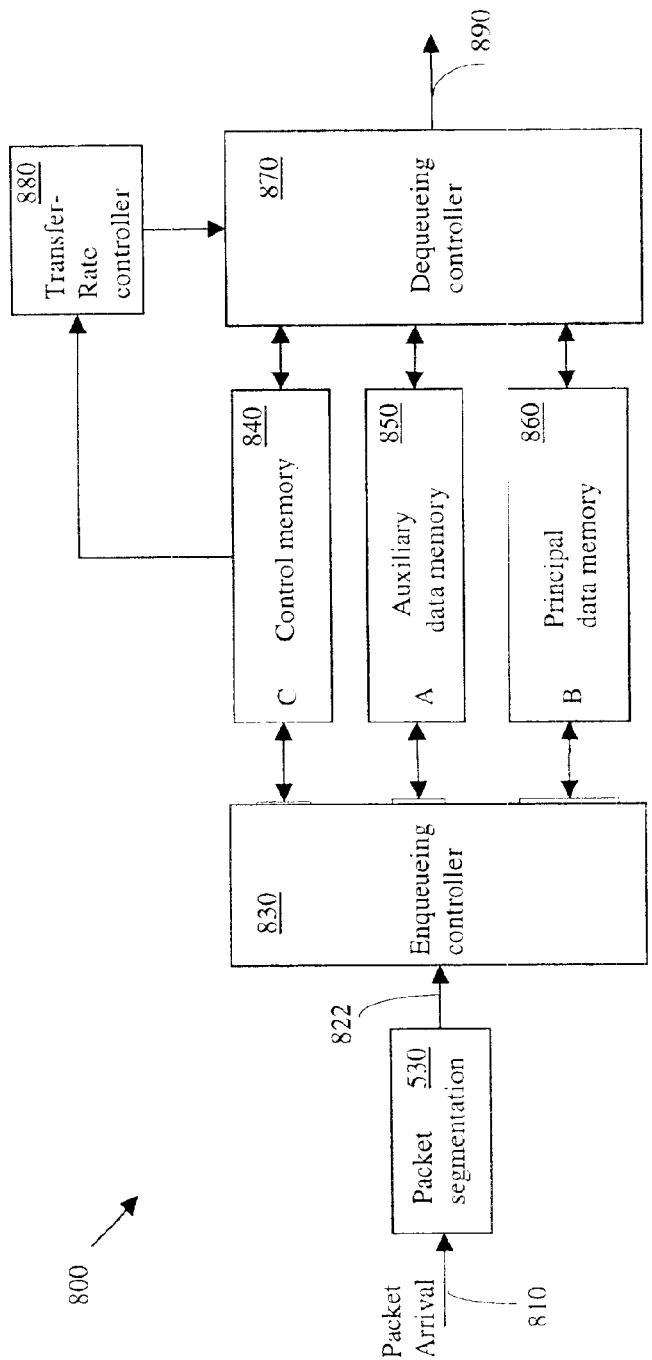
FIG. 8 is a schematic diagram of a segmentation apparatus.

FIG. 8 is a schematic diagram illustrating a compact-segmentation apparatus for packet concatenation operating under transfer-rate control. An arriving packet at a channel 810 is first segmented into fixed-size data blocks in a conventional manner, with the last data block (segment) possibly null-padded. Compact segmentation is performed by circuit 530 (see FIG. 5, FIG. 6 and FIG. 8). The segments are transferred to either an auxiliary data memory "A", 850, or principal data memory "B", 860, under control of an enqueueing controller 830 and using control memory "C", 840. The dequeueing of packet segments is performed by a dequeueing controller 870, which strictly obeys a rate controller 880. The rate controller 880 determines a guaranteed transfer rate for each traffic stream. As indicated earlier, a traffic stream is defined according to destination, service-quality, or any design or operational criteria. For routing purposes, it is preferable that the route selection be based only on the identifiers of a respective source node and respective sink node. The rate controller 880 receives rate allocations for each stream from a quality controller (not illustrated).

A segment is ready for transfer by the dequeueing controller 870 if it is a complete segment waiting in principal data memory B or a fractional segment waiting in auxiliary data memory A and has already been prompted by the rate controller a defined number of times. The dequeueing controller 870 has a transfer queue (not illustrated) to hold segments that are selected for transfer.

Rate-controllers are well known in the prior art. U.S. Pat. No. 6,034,960, issued on Mar. 7, 2000, and titled "ATM Service scheduler using reverse-binary scattering and time-space mapping", and U.S. Pat. No. 6,041,040, issued on Mar. 21, 2000, and titled "Large-scale service-rate regulators for ATM switching", the specifications of which are incorporated herein by reference, describe rate controllers that can handle a large number of data streams. The described controllers apply to fixed-size data segments and are not limited to ATM applications. Either can be employed as a rate controller 880.

A service-quality controller (not illustrated) allocates a transfer rate for each data stream based on both the payload of each data stream and packet overhead. Segmenting packets into fixed-size segments incurs an additional overhead due to the added headers and the null padding. With packet concatenation in accordance with the present invention, the additional overhead can be reduced to acceptable levels by appropriate selection of the segment size and the concatenation delay thresholds. In any case, the allocation of a transfer rate for each data stream must account for any overhead.

The rate controller 880 samples the data-stream-queues represented in memory "C". Each data stream is sampled at a nominal inter-sampling interval, which is the period between successive sampling instants of the same stream determined according to an allocated service rate for the stream. The actual sampling interval may deviate from the nominal sampling interval due to possible coincidence of the sampling instants of two or more streams. In a well-designed rate controller, the random variable representing the deviation of the actual sampling interval from the nominal sampling interval has a zero mean and a small coefficient of variation. The waiting time threshold for a given stream is conveniently expressed as an integer multiple of the nominal sampling interval of the stream.

The segments dequeued from principal data memory "B" or auxiliary data memory "A" are preferably placed in a "transfer queue" (not illustrated) within dequeueing controller 870. The use of the transfer-queue permits the dequeueing controller to simultaneously designate more than one segment as eligible for transfer.

Figure 9:
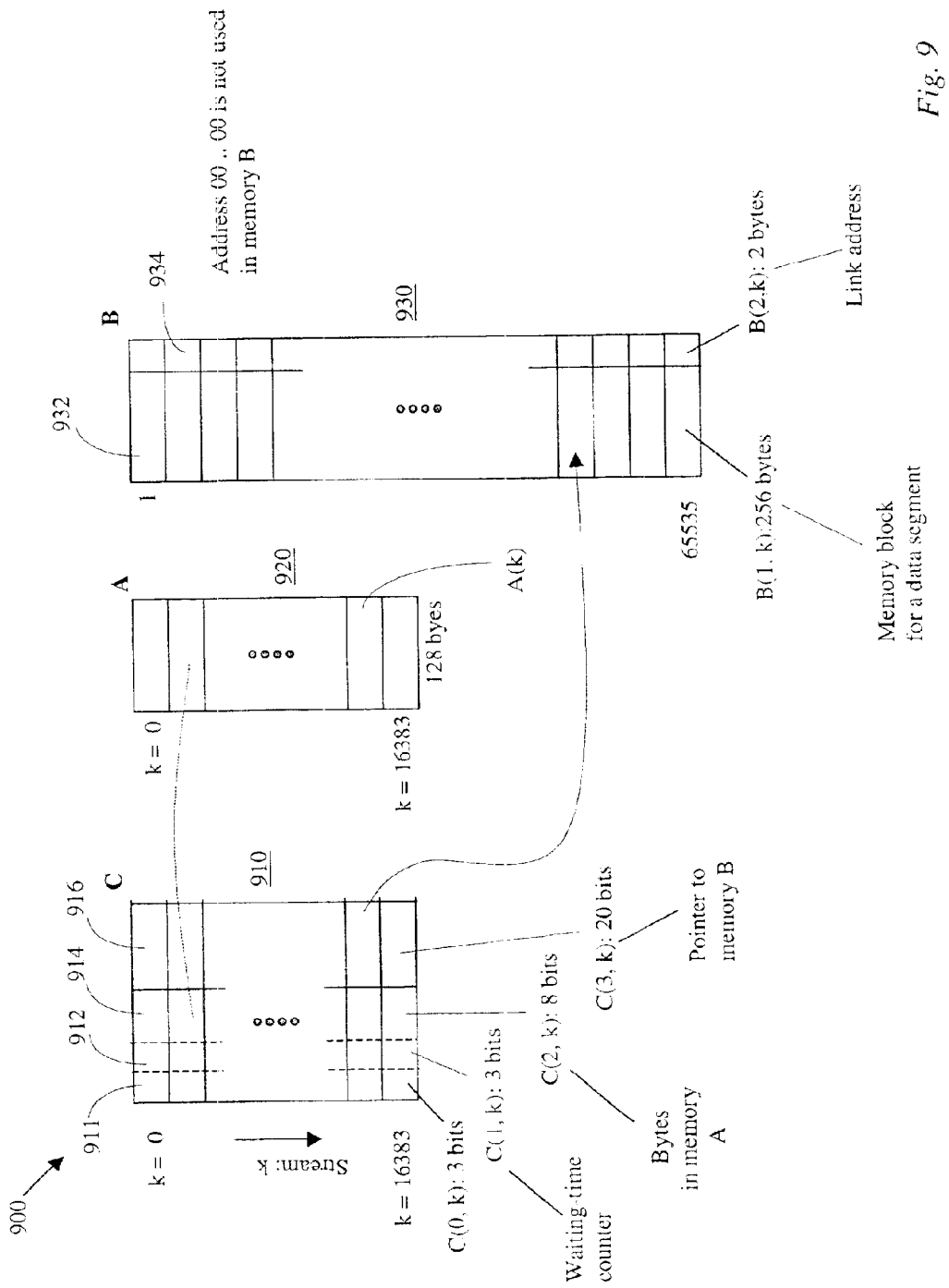
FIG. 9 is a schematic diagram of a data structure used in the apparatus of FIG. 8.

FIG. 9 is a schematic diagram showing the organization of memories "A", 850, "B", 860, and "C", 840, of FIG. 8. The structures of memories "A", "B", and "C" are shown as arrays 920, 930, and 910, respectively. Waiting data is stored in memory "A" and memory "B", while memory "C" stores control data. Memory "A" has as many entries as the number of traffic streams. In FIG. 9, a stream is defined according to destination only. A stream may comprise several connections, each connection being defined according to a traffic source or a group of traffic sources. A stream is typically defined for a node pair (a source node and a sink node). In the example of FIG. 9, the number of streams is limited to 16384 (0 to 16383). Each entry in memory "A" stores either a null indication or a data segment, possibly null-padded, corresponding to a destination. A null indication in position k in memory "A", $0 \leq k < 16384$, indicates that there is no fractional segment belonging to stream k. Memory "B" has as many rows as needed to store full segments that do not contain null-padding. In this example, and referring to array 930, the number of rows in memory "B" is limited to 65535. This limit is a design parameter. Address "0" in memory "B" is not used and is reserved for a control function as will be described below with reference to FIG. 11. When entry 916 in array 910 is zero, the dequeueing controller 870 concludes that there are no complete segments belonging to stream k waiting in memory B. Each row in array 930 has two fields. A first field 932 is sufficiently wide to accommodate a full segment (256 octets for example). A second field 934 is used to link rows of memory "B" that store segments belonging to common data streams. The width of the second field 934 is 2 octets in this example, to enable addressing a memory of 65535 entries. Generally, if structure 930 has Y rows, the width of field 934 is $\lceil \log_2 Y \rceil$, where $\lceil \ \rceil$ indicates rounding up to nearest integer. Memory "C" has as many rows as the number of traffic streams, as indicated in array 910, and there is a one-to-one correspondence between a row in array 920 and a row in array 910. Each row in array 910 has four fields. A first field 911 contains the normalized delay tolerance of corresponding streams, each delay tolerance being expressed as an integer multiple of a respective nominal stream sampling period, and only the integer multiplier is stored in field 911. The field is preferably limited to 3 bits. A second field 912 stores a count of waiting time of a fractional segment in a respective position in memory "A". The field 912 is 3 bits-wide in this example, indicating that the maximum permissible delay is seven sampling intervals, as will be explained in detail below. A third field 914 contains the number of information octets, excluding null-padding, in a data segment stored in a corresponding entry in memory "A". The maximum segment length in this example is 256 octets, thus the length of field 914 is 8 bits. A fourth field 916 contains a pointer to a row in memory "B", the row storing a data segment ready for transfer downstream in an associated network under control of dequeueing controller 870. A pointer value of zero in row k, $0 \leq k \leq 16384$, indicates that there are no complete segments in memory B belonging to stream k. The number of records in array 920 can be selected to be significantly smaller than the maximum number of traffic streams, since it is a rare event that a source node accumulates waiting fractional segments belonging to all streams simultaneously. Thus array 920 may be replaced by a pointer array (not illustrated) of 16384 entries of 14-bit words and an array (not illustrated) of a smaller number of records, for example 1024, each record containing 256 octets. This would reduce the memory requirement from about 2 megabytes to less than 0.2 megabytes with about 1200 fractional segments waiting in memory "A". It is noted that array 920 can be significantly shortened while rendering the probability of its full occupancy infinitesimally small. Array 910 ("C") can also be shortened. However, since it contains relatively short records, the number of records is set equal to the maximum permissible number of data streams.

If array 920 is shortened, as described above, and in the rare event that the shortened array is fully occupied, segments received from packet segmentation circuit 530 can wait in a buffer (not illustrated) within the enqueueing controller 830. This further reduces an already negligible probability of data loss.

As indicated above, memory "B" stores complete segments (having no null padding) that are awaiting transfer once permission is granted by the rate controller 880. Memory "A" stores fractional segments (null-padded) that are either awaiting concatenation with a forthcoming segment of the same data stream, or awaiting transfer permission despite the null-padding if a quality-control count recorded in a corresponding field 912 reaches a threshold. A reasonable threshold is two sampling intervals as determined by rate controller 880. However, the threshold may vary from one data stream to another and the threshold of each data stream is recorded in a corresponding field 911. The quality control count is triggered by rate controller 880. When the rate controller 880 prompts a stream to transfer a segment and the stream is found to have only a fractional segment in memory "A" (with no corresponding segments in memory "B"), the quality-control count in field 912 (C(1, k) for stream k) is increased by one. When the value of (C(1, k) equals the value of Q=C(0, k), the fractional segment in position k in memory "A", structure 920, is considered ready for transfer under control of dequeueing controller 870. By limiting the length of field 912 to 3 bits, a waiting threshold of up to seven sampling intervals is permitted. Such a high delay, of seven sampling intervals, would only be suitable for data streams that are delay insensitive. The delay tolerance is stream dependent and determined by the value C(0, k), for stream k, as read from field 911.

The arrays of FIG. 9 are initialized as follows. Array 920 (memory "A") is initialized by null entries. Array 930 has a number of records that is sufficient to hold waiting complete segments. This number is computed based on anticipated packet-size distribution and should be provisioned to render the probability of its exhaustion infinitesimally small ($10^{-12}$ or so). This can be computed based on an estimated distribution of packet sizes and the predefined segment size. Each record has two fields. The first field 932 holds complete segments and the second field 934 is a pointer to a chained row in the same structure 930. Field 932 need not be initialized and field 934 is initialized as zeros. Field 934 contains an index indicating the storage position, if any, of a next segment in a chain of segments forming a segment queue in array 920. The index is drawn from a pool of indices associated with the linked-list structure of array 930 in a manner well known in the art. Array 910 ("C") has a number of records that is equal to the maximum number of streams. Each record has four fields. Field 911 stores the delay tolerance per stream as explained above. Field 912 is a delay-control counter, field 914 holds the length of a corresponding fractional segment in array 920 (memory "A"), and field 916 holds a pointer to array 930 (memory "B"). All fields in all records in array 910 (memory "C") must be zero initialized. It is noted here that address "00-00" in array 930 ("B") is not used because a pointer "00-00" in field 916 is used to indicate the absence of a complete segment for a respective stream (this indication is used in FIG. 11). When the enqueueing controller 830 (FIG. 8) receives a data segment, it first determines its stream identifier k and its length L in octets. The controller 830 then determines whether stream k already has a fractional segment waiting for release, i.e., for transfer to a respective sink through the network. If there is a fractional segment waiting, the new segment is concatenated to the existing fractional segment. Otherwise, if there is no fractional segment waiting, the new segment is placed in principal array 930 ("B") if the segment is complete, or in auxiliary array 920 (stored in auxiliary data memory "A") if the segment is incomplete. The details of the enqueueing and dequeueing processes are given below with reference to FIG. 10, and FIG. 11, respectively.

Array 911 is initialized by the quality controller (not illustrated), which selects a delay threshold for each stream based on admission criteria, which are beyond the scope of this disclosure.

Figure 10:
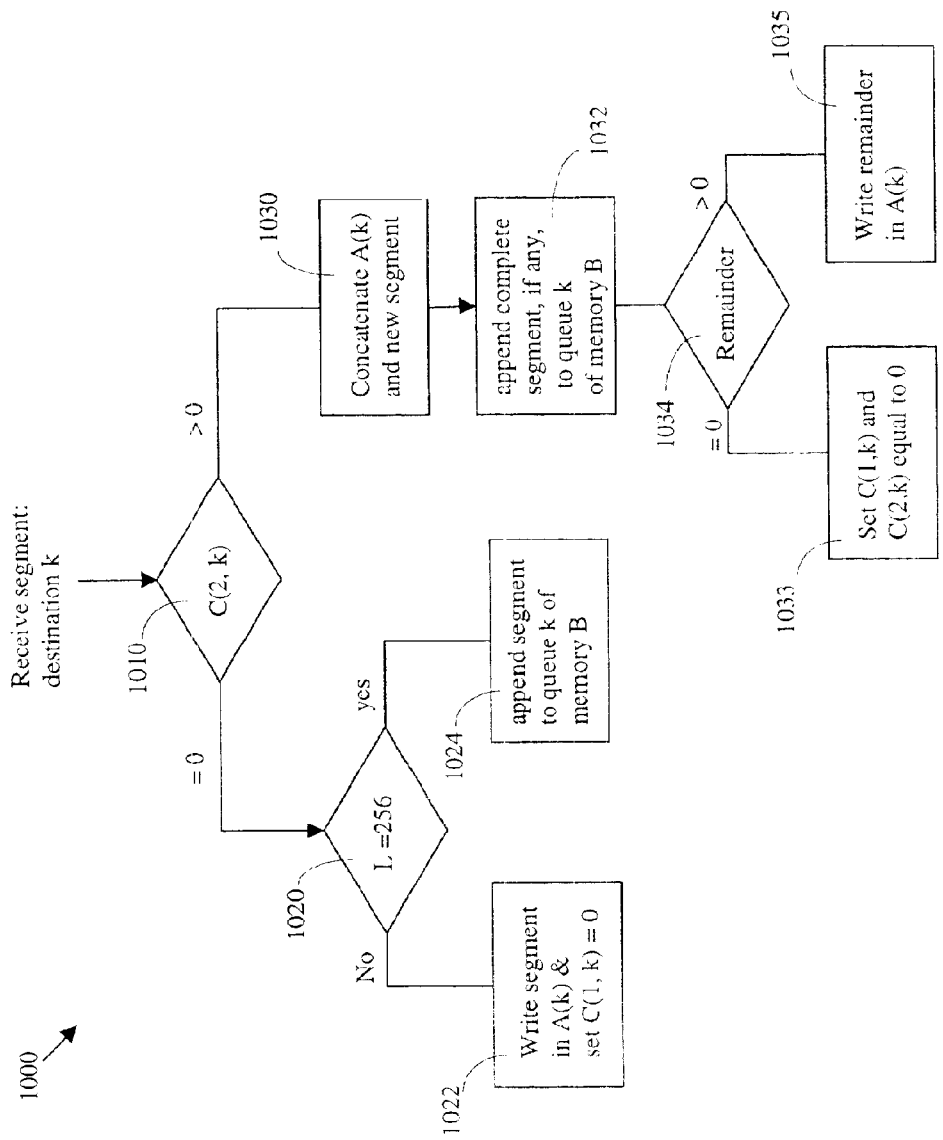
FIG. 10 is flow chart describing the functional steps of packet concatenation at a source node to enable efficient data transfer.

FIG. 10 shows the main steps followed upon receiving a data segment belonging to stream k (destination k, for example). When a packet is received and segmented into plain segments in a conventional manner by circuit 530 (FIG. 5 and FIG. 6), the plain segments are processed individually. The stream identifier k and the payload length, L, of the plain segment (which excludes the null padding) are determined. The four fields C(0, k), C(1, k), C(2, k) and C(3, k) corresponding to entries 911, 912, 914, and 916 in structure 910 of FIG. 9 are read simultaneously from memory "C". A value C(2, k) of 0 indicates that there is no fractional segment belonging to stream k. Thus, in step 1010, if C(2, k) is determined to be zero, control is transferred to step 1020, otherwise, control is transferred to step 1030. In step 1020, if the length L is determined to equal a predefined segment length (256 octets in this example), the segment is stored directly in memory "B" (array 930) which is organized as interleaved link lists (step 1024). (Interleaved linked lists are well known in the art and are not described here. Basically, they allow dynamic sharing of a memory by X>1 data streams using X insertion pointers and X removal pointers.) Otherwise, if in step 1020 the value of L is determined to be less than a full-segment length, the fractional segment is placed in position k in array 920 of memory "A" (step 1022). Note that, at this point, the position k in array 920 is vacant since C(2, k) has been determined to be zero. The fractional segment will remain in memory "A" until it is either concatenated with a forthcoming segment of the same stream k, or is prompted a specified number of times, Q=C(0, k), by the rate controller, whichever takes place first. When a fractional segment is prompted Q times, it is qualified for transfer regardless of its content. If, on the other hand, the entry C(2, k) is found in step 1010 to be greater than zero, the enqueueing controller 830 (FIG. 8) concludes that there is a waiting fractional segment belonging to stream k. The arriving segment, whether complete or fractional, is then concatenated with the existing fractional segment (step 1030). In step 1032, if the result equals or exceeds a full segment, a full segment is appended directly to a corresponding queue in memory "B" (array 930) which can hold several interleaved queues, each belonging to a sink node. If the remainder of concatenation is greater than zero, the remainder is placed back in position k in array 920 of memory "A" (step 1035). If the remainder is zero, corresponding entries C(1, k) and C(2, k) in array 910 are set equal to zero (step 1033) to indicate to a future arriving segment that there is no waiting fractional segment belonging to stream k. (The interleaved linked lists are addressed independently but they share the same memory device.)

A fractional segment may contain data from different packets belonging to the same stream. The "age" of a fractional segment is the age of the first packet that forms the fractional segment. The algorithm shown in the flow chart of FIG. 10 retains the age of the first packet that creates the fractional segment until the fractional segment is transferred. The age of a fractional segment is also called the delay of the stream to which it belongs.

Figure 11:
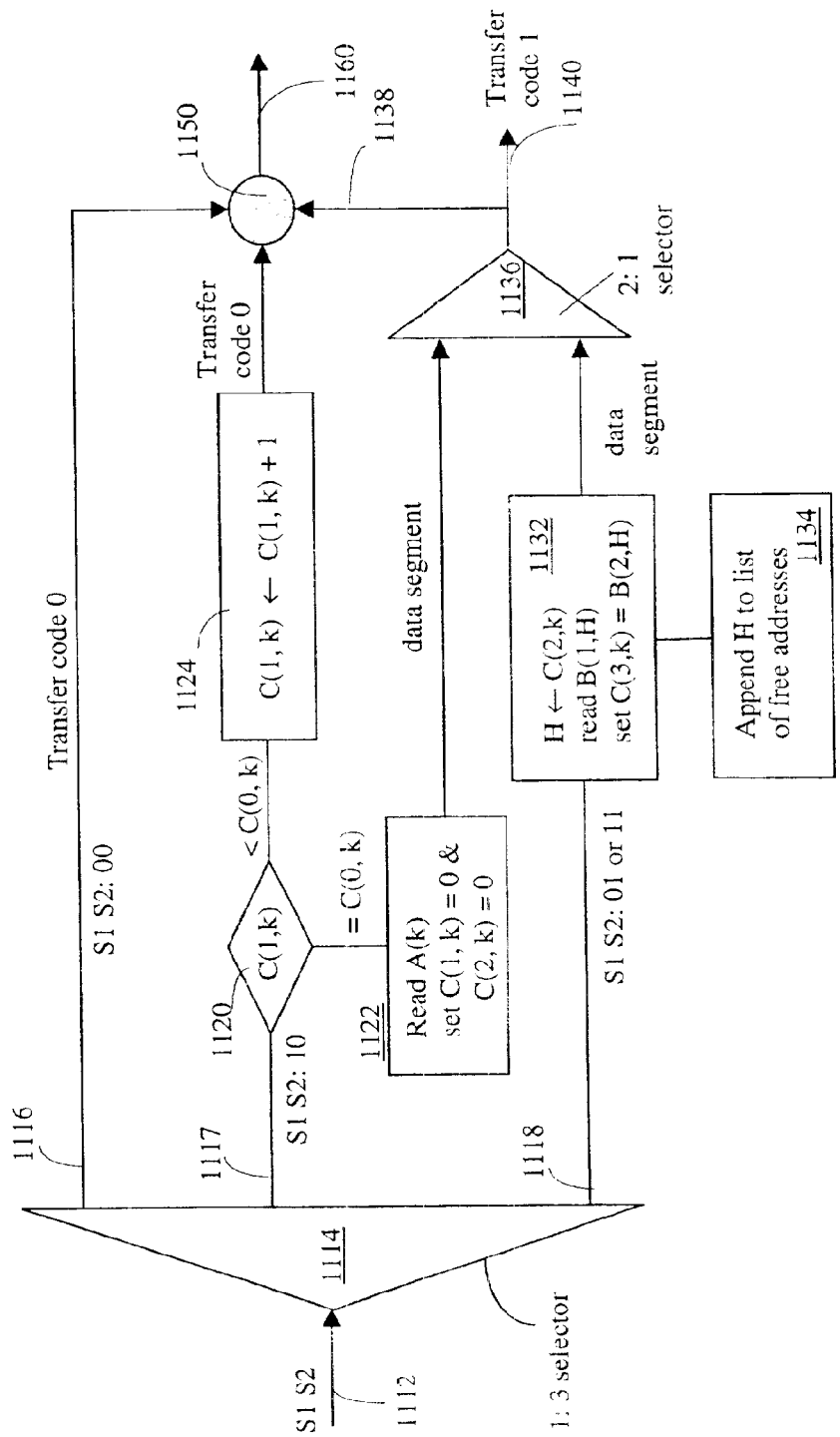
FIG. 11 is a flow chart showing the steps leading to the transfer of packet segments from a source node.

FIG. 11 is a flow chart showing the dequeueing of segments under rate control. Note that the process of FIG. 10 is triggered by a packet arrival while the process of FIG. 11 is triggered by a rate controller indicating service eligibility for a stream k. When the rate controller 880 (FIG. 8) indicates that a stream k is eligible for segment transfer, two single-bit numbers S1 and S2 are determined (1112) by a simple logic circuit (not illustrated). S1 equals 0, if C(2, k)=0, and equals 1 otherwise. S2 equals 0, if C(3, k)=0, and equals 1 otherwise. Selector 1114 selects one of three branches 1116, 1117, and 1118, based on the value of S1S2. Branch 1116 is selected if S1S2 is "00", branch 1117 is selected if S1S2 is "10", and branch 1118 is selected if S1S2 is either "01" or "10". If the 2-bit number S1S2 is "00", the dequeueing controller 870 (FIG. 8) concludes that there are no segments belonging to stream k waiting in either memory "A" or memory "B". It then returns a code "0" to the rate controller 880 (FIG. 8) via branch 1116 and selector 1150. The rate controller 880 may use the return code to credit stream k or to perform other functions specific to its internal operation. If the number S1S2 is "10", the dequeueing controller 870 concludes that there is a fractional segment in memory "A" but no segments in memory "B" belonging to stream k. In step 1120, if the quality-control counter C(1, k) is found to be less than a threshold Q=C(0, k), then control is transferred to step 1124 where C(1, k) is increased by one and a transfer code of 0 is returned to the rate controller 880 via selector 1150. Otherwise, if in step 1120 the quality-control counter C(1, k) is determined to have reached the threshold Q=C(0, k), control is transferred to step 1122 where the entries C(1, k) and C(2, k) are reset to zero and the fractional packet waiting in memory "A" at entry k is transferred to the network through selector 1136 and outgoing link 1140.

If the number S1S2 is either "01" or "11", the dequeueing controller 870 concludes that there is a complete segment belonging to stream k waiting in memory "B". Selector 1114 then selects branch 1118 and control is transferred to step 1132. The existence, or otherwise, of a waiting fractional segment belonging to stream k in memory "A" is irrelevant. The complete segment is then transferred from memory "B" to the network, as indicated in step 1132, through selector 1136 and outgoing link 1140. Normal "book keeping" functions, such as the return of the address H=C(3, k) to the pool of free B-addresses, are performed in step 1134.

The processes of FIG. 10 and FIG. 11 are preferably pipelined to maximize the throughput, the throughput being the number of packets that can be handled per unit time. Circuitry for pipelining these processes are within the prior art.

Figure 12:
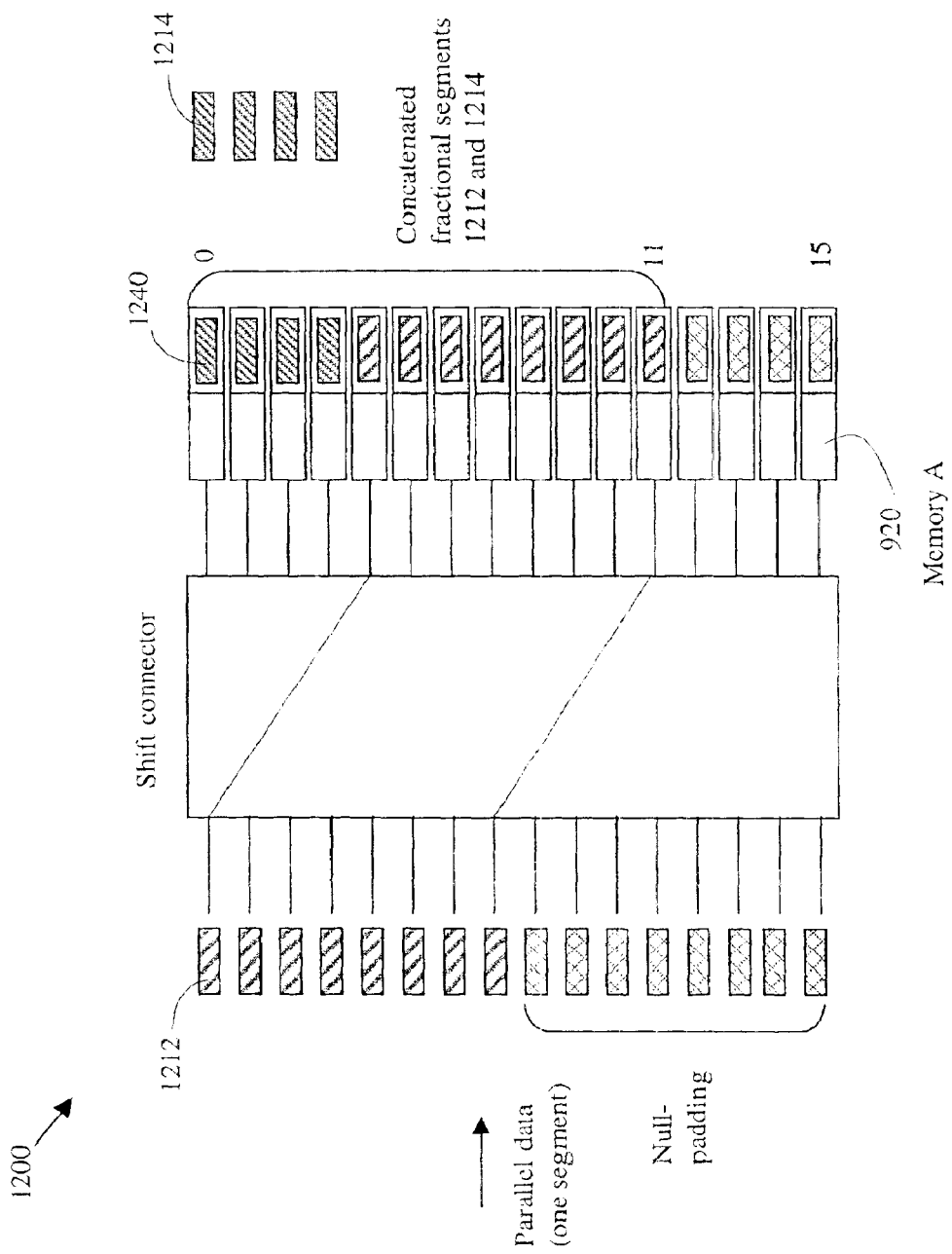
FIG. 12 illustrates the process of segment merging yielding a single composite segment.
Figure 13:
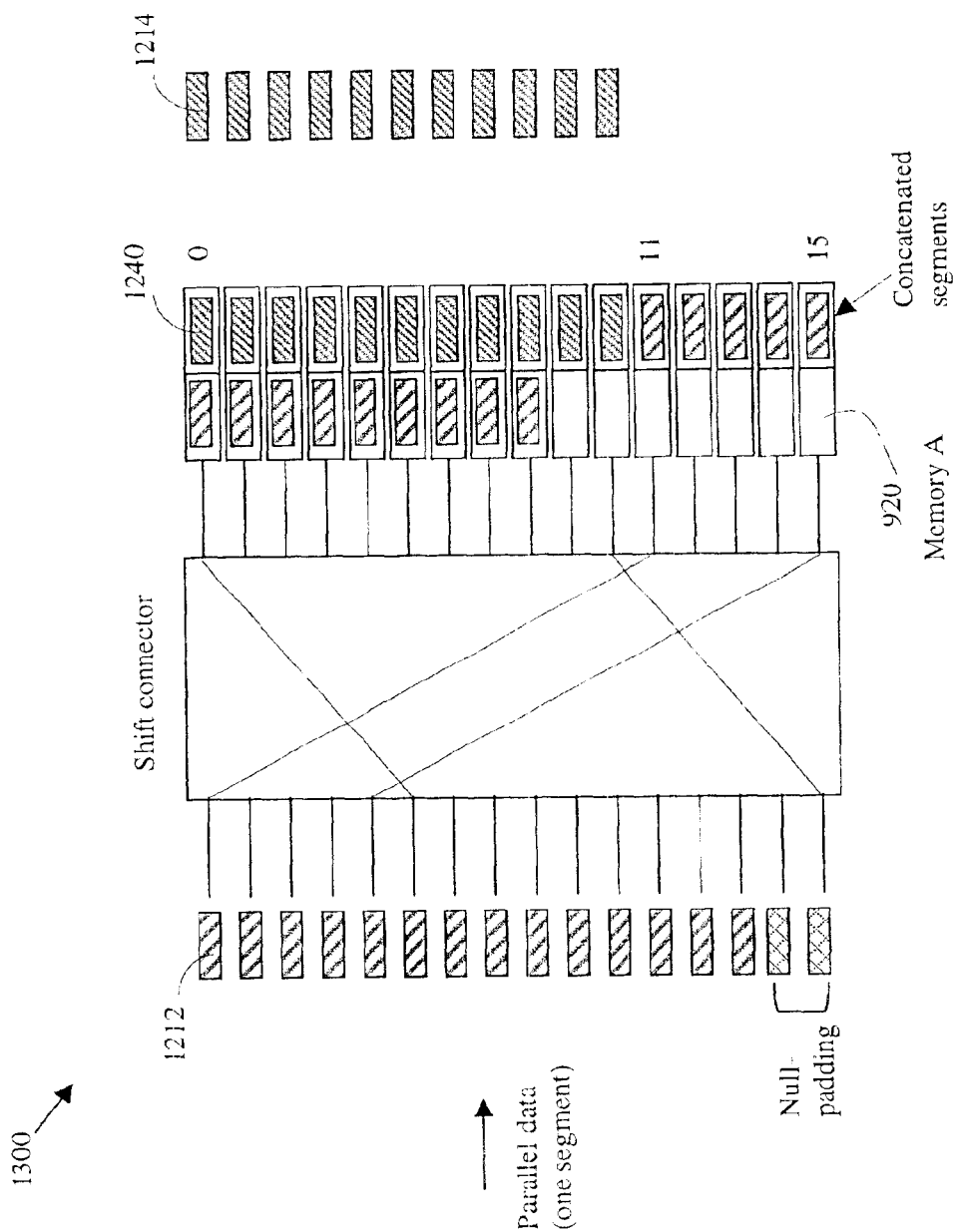
FIG. 13 illustrates the process of segment merging, yielding a composite segment and a remainder.
Figure 14:
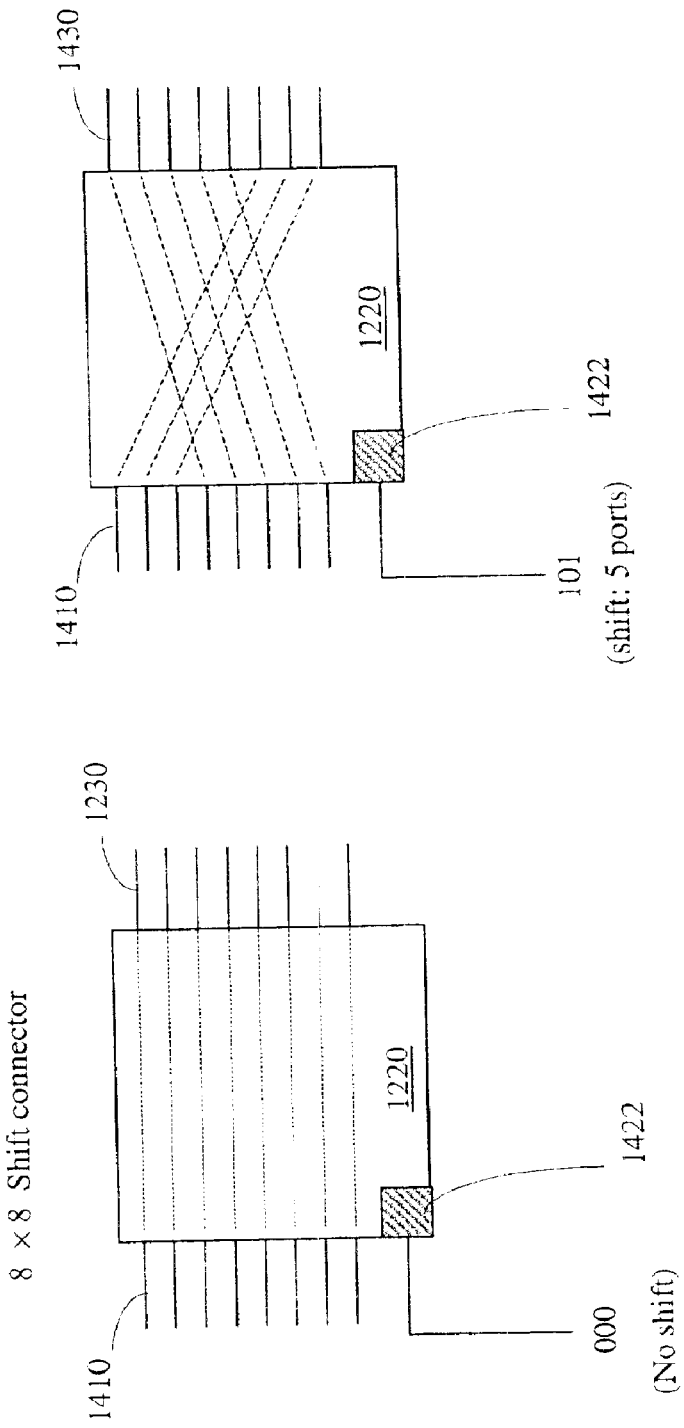
FIG. 14 is a schematic diagram illustrating the use of a shift connector to concatenate data segments.
Figure 15:
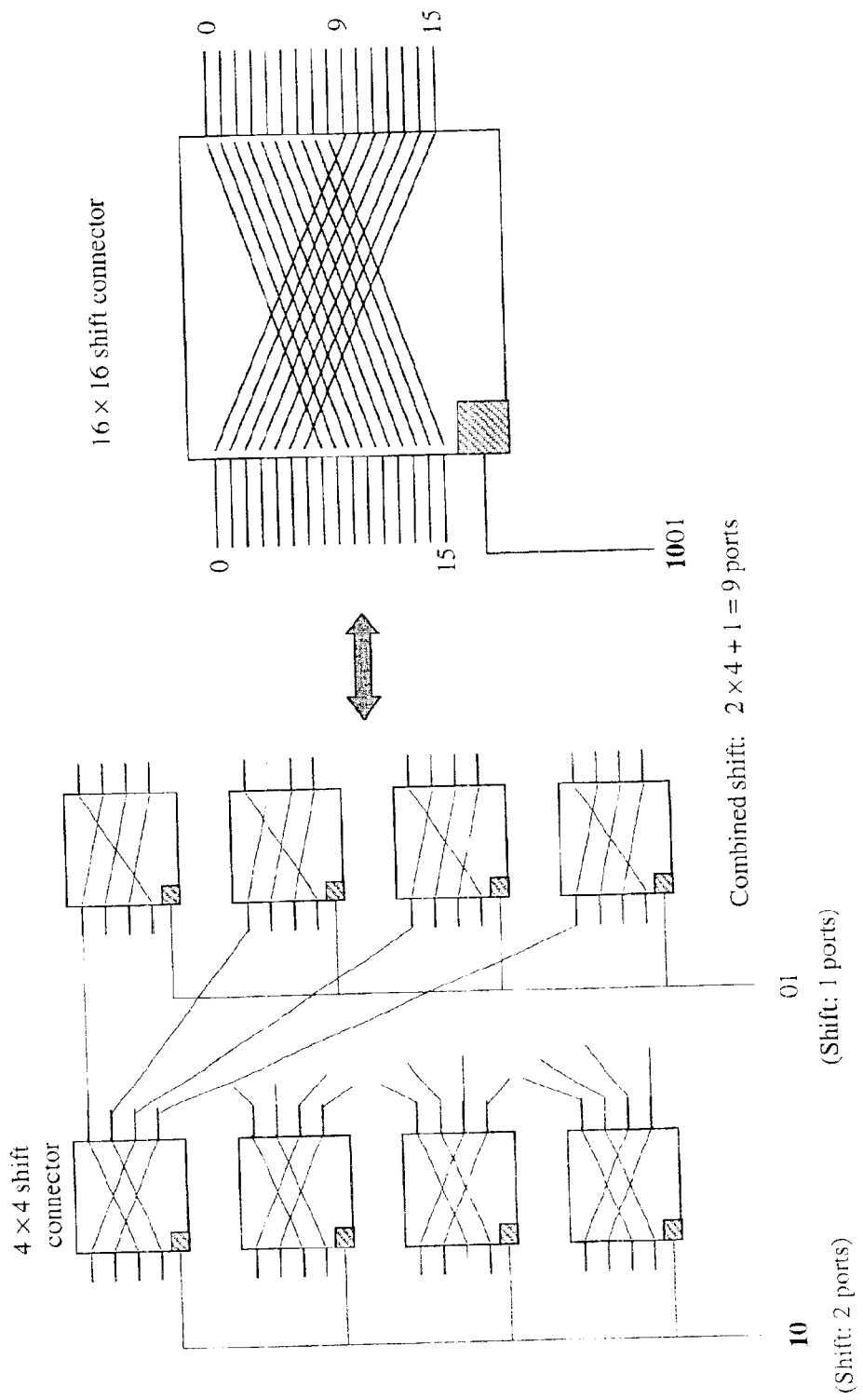
FIG. 15 shows a two-stage construction of a high-capacity shift connector using lower-capacity shift connectors.

FIG. 12 and FIG. 13 illustrate the process of concatenating a new segment, complete or fractional, with a current fractional segment. A shift-connector is used for this purpose. In a K×K shift connector, in which the K input links are consecutively numbered from 0 to K−1, and the K output links are consecutively numbered from 0 to K−1, a shift index J, 0<J<K, causes each input link X, 0<X<K, to connect to an output link Y, Y=[X+J], modulo K. The function of a shift connector (well-known in the art) is depicted in FIG. 14 which shows an 8×8 shift connector with J=000 (no shift) and J=101 (a shift of five positions). FIG. 15 illustrates the construction of a large-size shift connector using two stages of smaller-size shift connectors. In the example shown, a 16×16 shift connector is constructed from 4×4 shift connectors. The left-most J/2 bits of J represent the shift value for each of the first array of shift connectors and the right-most J/2 bits represent the shift of each of the second array of shift connectors. The process can be generalized to any number of stages and the lengths of the shift indices for the stages need not be equal. For example, a 32×32 shift connector can be constructed from a first array of eight 4×4 shift connectors and a second array of four 8×8 shift connectors. A two-bit shift index $J_1$ applied to each of the 4×4 shift connectors and a three-bit shift index $J_2$ applied to each of the 8×8 shift connectors result in a shift of $(J_1. J_2)$ positions, the $J_1$ bits being the most significant bits. This arrangement may be reversed with the first array comprising four 8×8 shift connectors each activated by a three-bit shift index $J_2$ and the second array comprising eight 4×4 shift connectors, each activated by a two-bit shift index $J_1$, resulting in a total shift of $(J_2, J_1)$, $J_2$ constituting the most significant bits.

In the example of FIG. 12, an incoming fractional segment 1212 has 16 words of which eight are data words and eight are null padding words. Segment 1212 is to be concatenated with a fractional segment 1214 of 4 data words initially stored in memory "A" (850, FIG. 8). The data words of fractional segment 1214 in memory "A" are first copied on a bank of registers 1240. The data words of the incoming segment 1212 are input to a 16×16 shift connector. With an appropriate value of the shift J, a fractional segment of 12 words is created in the bank of registers 1240 and is copied on memory "A". An indication of the length of the new fractional segment is stored in a respective entry C(2, k) in array 910. The length of the new fractional segment is computed with conventional circuitry.

In the example of FIG. 13, an incoming fractional segment 1212 has 16 words of which 14 are data words and two are null-padding words. Segment 1212 is to be concatenated with a fractional segment 1214 of 11 data words initially stored in memory "A" (850, FIG. 8). The data words of fractional segment 1214 in memory "A" are first copied on a bank of registers 1240. The data words of the incoming segment 1212 are input to a 16×16 shift connector. With an appropriate value of the shift J, a complete segment is created in the bank of registers 1240 and the remainder of 9 words is stored in memory "A" (850, FIG. 8). Counter C(1, k) in array 910 (FIG. 9) is reset to zero and an indication of the length of the remainder is stored in a respective entry C(2, k) in array 910.

Figure 16:
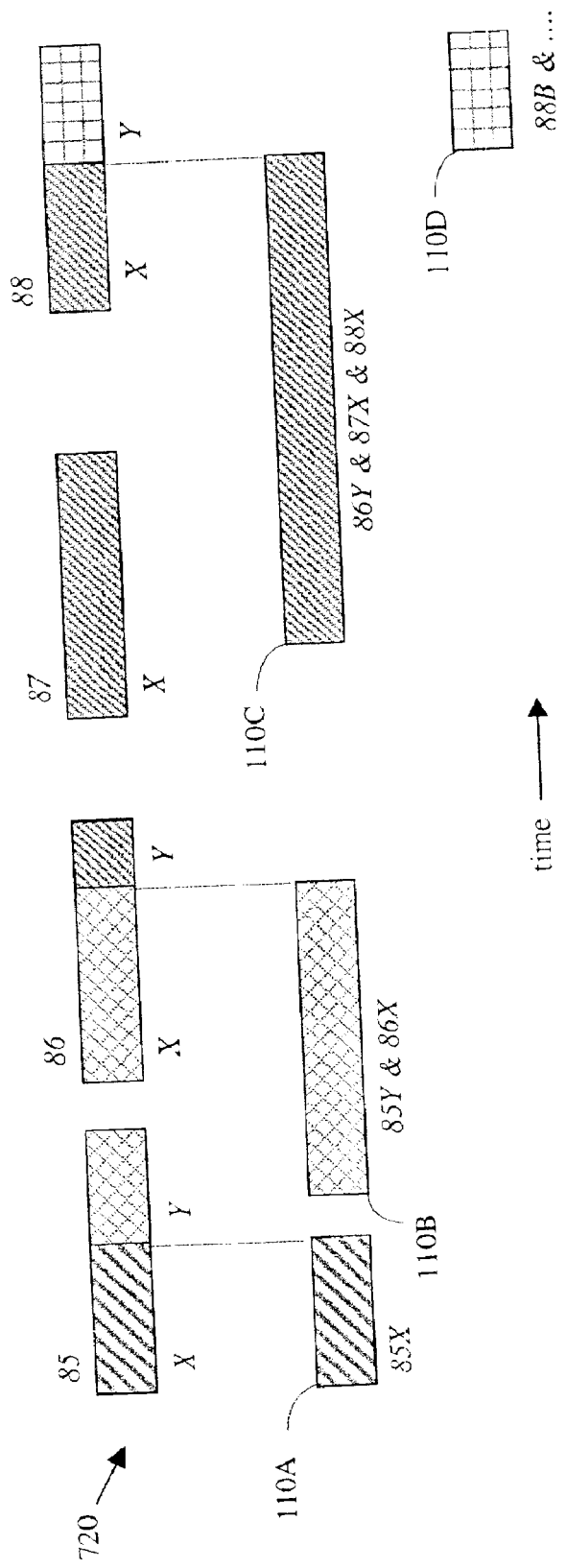
FIG. 16 illustrates the packet reconstruction process in a packet reconstruction circuit at an egress port of a sink node.

The segments received at a sink module 520 (FIG. 5) or 620 (FIG. 6) are processed in packet reconstruction circuits 550. The reconstruction process is illustrated in FIG. 16. Four received segments belonging to the same stream and having the sequential labels 85, 86, 87, and 88, are shown, and the four segments will be referenced by their respective labels in the following description. The four segments would have been sent by sources supported by the same source node. The time separation between any two successive segments should be an integer multiple (including zero) of a segment duration. The time separation in the figure is altered, however, for clarity of illustration. The parsing and reconstruction of the packets is illustrated. (In FIG. 16, the parts of a segments that belong to different packets are identified by prefixes X, Y, etc. In this example, a segment contains data belonging to one or two packets.) The first segment 85 contains a packet 110A in its X part and the front end of a subsequent packet 110B in its Y part. (Recall that the original packets are referenced by the numerals 110 in FIG. 1.) The parsing of segment 85 is based on its header (not illustrated). The intermediate header (not illustrated) of segment defines the length subsequent packet 110B. The reconstruction of packet 110B starts after reading the header of subsequent segment 86, which—in this example—indicates that the tail part of packet 110B is completely included in segment 86. Packet 110B comprises the Y part of segment 85 and the X-part of segment 86. The concatenation of the Y part of segment 86 and the X part of segment 87 starts after reading the header of segment 87. Based on the packet length read from the intermediate header of segment 86, circuit 550 determines that the remainder of the packet is arriving in forthcoming segments. Nevertheless, the Y part of segment 86 and the X part of segment 87 (in this example, the X part is the entire segment) are concatenated. Completion of the construction of packet 110C starts after reading the header of segment 88. The Y-part of segment 88 may not contain a full packet, in which case it is retained to join the front end of a forthcoming segment 89, and so on.

The invention therefore provides a method of, and apparatus for, packet transfer in a communications network. The data is transferred in fixed-size data segments by concatenating packets of same destination, but belonging to different users, in order to simplify the network design while minimizing segmentation waste and satisfying the service-quality requirements of each data stream.

The embodiments of the invention described above are intended to be exemplary only. Other modifications will be apparent to those skilled in the art, and the invention is, therefore, defined in the claims.

We claim:

1. A method of segmenting variable-size packets, each packet being associated with one of a plurality of defined data streams, the method comprising steps of:
   concatenating packets of each data stream, from among said plurality of data streams, into concatenated packets; and
   dividing each of said concatenated packets into equal-size segments,
   wherein said steps of concatenating and dividing are constrained by an adaptive delay threshold;
   and wherein the adaptive-delay threshold is determined by an allocated transfer rate to said each data stream;
   and wherein the adaptive delay threshold is governed by a transfer rate controller.

2. The method as claimed in claim 1 wherein the adaptive delay threshold is data-stream dependent.

3. In a network comprising source nodes and sink nodes, the method as claimed in claim 1 wherein said step of concatenating is applied at the ingress port of a source node.

4. In a network comprising source nodes and sink nodes, the method as claimed in claim 1 wherein said step of concatenating is applied at the output port of a source node.

5. In a switching node receiving packets from a plurality of incoming channels, a method of two-phase packet segmentation comprising:
   segmenting individual packets in a first phase into first-phase segments using a plurality of first-phase segmentation circuits;
   segmenting an aggregate of packets in a second phase into second-phase segments using a plurality of second-phase segmentation circuits;
   switching an output of said first-phase segmentation circuits to said second-phase segmentation circuits under control of a routing algorithm;
   wherein said routing algorithm selects routes from an incoming channel to a sink node using a method of maximum aggregation probability.

6. The method as claimed in claim 5 wherein said first-phase segments are of equal size and said second-phase segments are of equal size and the size of a second-phase segment is an integer multiple of the size of a first-phase segment.

7. The method as claimed in claim 5 wherein a first-phase segmentation circuit is allocated to an incoming channel.

8. A data structure to enable merging equal-size null-padded data segments into new equal-size data segments having reduced null-padding, the data segments belonging to K>1 data streams, the data structure comprising:

(i) An array "A" of fractional segments having K entries, each entry dedicated to a data stream;

(ii) An array "B" of complete segments having K1>K entries; and (iii) a control matrix "C" having K records, each record dedicated to a data stream and having four fields to indicate, for a corresponding stream, the stream's delay threshold, the stream's current delay, the fill of a respective fractional-segment in array "A", and the address of a complete segment in array "B".

9. The data structure as claimed in claim 8 wherein the size of each of said new equal-size data segments is an integer-multiple of the size of each of said equal-size null-padded data segments.

10. The data structure as claimed in claim 8 wherein array "A" is directly indexed by a stream identifier.

11. The data structure as claimed in claim 8 wherein array "A" is replaced by a pointer array and a segment-Storage array.

12. In conjunction with the data structure as claimed in claim 8 a method for data segmentation including steps of (a) Receiving a plain segment of a stream k, $0 \leq k < K$;

(b) Merging said plain segment with data content of array "A" at storage position k;

(c) Appending a complete segment resulting from said merging to a queue associated with data stream k in array "B"; and (d) Overwriting a fractional segment resulting from said merging in memory "A" at position k.

13. The method as claimed in claim 12 wherein a plurality of plain segments are processed concurrently.

14. The method as claimed in claim 12 wherein pointers to transferred segments are placed in a transfer queue.

15. In conjunction with the data structure as claimed in claim 8 a method of controlling data segments transfer, the method including steps of:

(e) Receiving from a transfer rate controller a prompt to transfer a data segment of a stream k, $0 \leq k < K$;

(f) Transferring a complete segment belonging to data stream k in array "B" if said complete segment exists; else (g) Transferring a fractional segment belonging to data stream k in array "A" if said fractional Segment exists and has already been prompted by said rate controller a predefined number of times; else (h) Return a no-action indication to rate controller.

16. A compact-segmentation apparatus operable to segment variable-size packets into compact fixed-size segments, the apparatus comprising (a) a packet segmentation circuit;

(b) an enqueueing controller;

(c) a principal data memory;

(d) an auxiliary data memory;

(e) a control memory (f) a dequeueing controller; and (g) a transfer-rate controller;

wherein said packet segmentation circuit receives variable-size packets and segments each of said variable-size packets into plain segments, said packet segmentation circuit identifies a data stream associated with each one of said variable-size packets, said enqueueing controller communicates with said control memory, said principal data memory, and said auxiliary data memory, and concatenates said plain segments of a data stream with previously-received segments of same data stream, said transfer-rate controller selects a selected data stream, and said dequeueiflg controller selects data segments, belonging to said selected data stream, from waiting data segments in said principal data memory and said auxiliary data memory for transfer downstream.

17. The apparatus as claimed in claim 16 wherein the rate controller is driven by a service-quality controller.

18. The apparatus as claimed in claim 17 wherein the service-quality controller is source-node driven.

19. The apparatus as claimed in claim 17 wherein the service-quality controller is driven by a source node controller.

20. The apparatus as claimed in claim 17 wherein a segment is ready for transfer by the dequeueing controller if it is a complete segment waiting in the principal data memory or a fractional segment waiting in the auxiliary data memory and has already been prompted by the rate controller a predefined number of times.

21. The apparatus as claimed in claim 16 wherein the principal data memory is structured as a multi-head interleaved linked list.

22. A circuit for fast concatenation of a first picket of a known length and a second packet of a known length into a complete segment of n predefined length, the circuit comprising a shift connector, a memory array, and a register array, the length of said first packet being smeller than said predefined length and the length of said second packet being less than said predefined length, wherein said first packet is copied onto said register array, said shift connector performs a concatenation process that concatenates said second packet with said first packet onto said register array placing any remainder resulting from said concatenation process in said memory array.

23. The circuit as claimed in claim 22 wherein the shift connector is constructed from arrays of shift connectors of a smaller size.

24. The circuit as claimed in claim 23 wherein each array comprises identical shift connectors and the sizes of shift connectors in different arrays are different.

* * * * *

UNITED STATES PATENT AND TRADEMARK OFFICE
CERTIFICATE OF CORRECTION

PATENT NO. : 6,888,848 B2
DATED : May 3, 2005
INVENTOR(S) : Beshai

It is certified that error appears in the above-identified patent and that said Letters Patent is hereby corrected as shown below:

Column 1,
Line 5, insert -- This invention was made with Government support under Technology Investment Agreement F30602-98-2-0194 awarded by the Air Force. The Government has certain rights in this invention. --.

Signed and Sealed this

Twenty-third Day of August, 2005

JON W. DUDAS
*Director of the United States Patent and Trademark Office*